United States Patent
Kerschner et al.

[19]

[11] Patent Number: 6,064,496
[45] Date of Patent: May 16, 2000

[54] SCANNING DEVICE WITH FLOATING WINDOW MEMBER

[75] Inventors: Ronald K. Kerschner, Loveland; Thomas E. Berg; Jacklyn M. Dowdy, both of Fort Collins, all of Colo.

[73] Assignee: Hewlett-Packard Company, Palo Alto, Calif.

[21] Appl. No.: 08/878,110

[22] Filed: Jun. 18, 1997

[51] Int. Cl.[7] ..................................................... H04N 1/40
[52] U.S. Cl. ........................... 358/471; 358/473; 358/474
[58] Field of Search .................................. 358/471, 473, 358/474, 494, 497, 400

[56] References Cited

U.S. PATENT DOCUMENTS

| | | | |
|---|---|---|---|
| 4,115,703 | 9/1978 | Dobras | 250/568 |
| 4,240,748 | 12/1980 | Blanc et al. | 356/138 |
| 4,703,186 | 10/1987 | Nakayama et al. | 250/566 |
| 4,709,144 | 11/1987 | Vincent | 250/226 |
| 4,819,083 | 4/1989 | Kawai et al. | 358/294 |
| 4,870,268 | 9/1989 | Vincent et al. | 250/226 |
| 4,894,523 | 1/1990 | Chadima, Jr. et al. | 235/472 |
| 4,899,228 | 2/1990 | Sano et al. | 358/473 |
| 4,926,041 | 5/1990 | Boyd | 250/226 |
| 4,967,188 | 10/1990 | Collins, Jr. | 340/636 |
| 4,969,054 | 11/1990 | Tsuji et al. | 358/473 |
| 5,019,703 | 5/1991 | Boyd et al. | 250/208.1 |
| 5,032,004 | 7/1991 | Steinle | 350/171 |
| 5,038,028 | 8/1991 | Boyd et al. | 250/208.1 |
| 5,040,872 | 8/1991 | Steinle | 359/638 |
| 5,044,727 | 9/1991 | Steinle | 350/171 |
| 5,175,422 | 12/1992 | Koizumi et al. | 235/472 |
| 5,182,450 | 1/1993 | Pan | 250/234 |
| 5,227,620 | 7/1993 | Elder, Jr et al. | 250/208 |
| 5,301,243 | 4/1994 | Olschafskie et al. | 382/59 |
| 5,306,908 | 4/1994 | McConica et al. | 250/234 |
| 5,381,020 | 1/1995 | Kochis et al. | 250/566 |
| 5,410,347 | 4/1995 | Steinle et al. | 348/270 |
| 5,430,558 | 7/1995 | Sohaei et al. | 358/473 |
| 5,434,680 | 7/1995 | Noda et al. | 358/471 |
| 5,534,684 | 7/1996 | Danielson | 235/472 |
| 5,552,597 | 9/1996 | McConica | 250/234 |
| 5,586,212 | 12/1996 | McConica et al. | 385/146 |
| 5,687,007 | 11/1997 | Yamazaki et al. | 358/474 |
| 5,777,321 | 7/1998 | Kerschner et al. | 358/474 |

FOREIGN PATENT DOCUMENTS

| | | |
|---|---|---|
| 0168256 | 1/1986 | European Pat. Off. . |
| 0270686 | 6/1988 | European Pat. Off. . |
| 0785664A2 | 7/1997 | European Pat. Off. .......... H04N 1/03 |
| 0786893A2 | 7/1997 | European Pat. Off. ....... H04N 1/107 |
| WOA8801123 | 2/1988 | WIPO . |
| WO 92/22978 | 6/1992 | WIPO .............................. H04N 1/04 |
| WO92/11610 | 7/1992 | WIPO .............................. G06K 9/22 |

OTHER PUBLICATIONS

Modern Optical Engineering, The Design of Optical Systems–Second Edition, Warren J. Smith pp. 430–453. Copyright 1990 by McGraw–Hill, Inc.
Vol. 12 No. 256, Jul. 19, 1988 Mitsubishi Electric.
Vol. 17 No. 152 Mar. 25, 1993 Canon, Inc.
U.S. application No. 08/601,276, Kerscher et al. filed Jan. 29, 1996.
U.S. application No. 08/592,904, Kerscher et al. filed Jan. 29, 1996.

*Primary Examiner*—Thomas D Lee

[57] ABSTRACT

The present invention is directed to a hand-held scanning device in which the scanning device housing window is attached directly to the optical assembly. In this manner, alignment between the window and the optical assembly may be maintained even when the housing is being subjected to stress. The window is also designed to float with respect to at least a portion of the housing, thus allowing the housing to flex without causing movement of the window relative to the optical assembly. A tortuous path seal arrangement may be provided between the window and the housing. The tortuous path seal allows the housing to move relatively to the window, and yet inhibits the entry of dust and other contaminants into the interior of the housing through the space provided between the window and the housing.

27 Claims, 17 Drawing Sheets

SCANNING DEVICE WITH FLOATING WINDOW MEMBER

FIELD OF THE INVENTION

The present invention relates generally to optical scanners and, more particularly, to optical scanners of the type having a window assembly which closes the scanner housing and which is located between the scanning optics and the object to be scanned.

BACKGROUND OF THE INVENTION

Optical scanners are well-known in the art and produce machine-readable data which is representative of the image of an object, e.g., a page of printed text. Optical scanners generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as a "pixel") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays. Other optical scanners project color component images on a single linear array in a series of separate scanning passes.

The construction and operation of color optical scanners employing beam splitter assemblies and photosensor arrays are disclosed in the following United States Patents: U.S. Pat. No. 5,410,347 of Steinle et al. for COLOR OPTICAL SCANNER WITH IMAGE REGISTRATION HOLDING ASSEMBLY; U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application no. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); U.S. Pat. No. 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM SPLITTER/COMBINER APPARATUS (and corresponding EPO patent application no. 91303860.3 filed Apr. 29, 1991); U.S. Pat. No. 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); and U.S. Pat. No. 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991), which are all hereby specifically incorporated by reference for all that is disclosed therein.

A hand-held optical scanning device is an optical scanner which is moved across a scanned object, e.g. a page of text, by hand. Optical systems for hand-held scanning devices must generally be very compact due to the relatively small size of hand-held scanning devices.

Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is disclosed in United States patents: U.S. Pat. No. 5,381,020 of Kochis et al. for HAND-HELD OPTICAL SCANNER WITH ONBOARD BATTERY RECHARGING ASSEMBLY; U.S. Pat. No. 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994), U.S. Pat. No. 5,723,859 of Kerschner et. al. for LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION and U.S. Pat. No. 5,777,321 of Kerschner et al. for SCANNING DEVICE WITH NON-CONTACT OPTICAL COMPONENTS; which are all hereby specifically incorporated by reference for all that is disclosed therein.

In most hand-held optical scanning devices, the optical components and electronics of the scanning device are enclosed in a housing which is adapted to be grasped by the hand of a user while a scan is being performed. The housing generally also rotatably mounts the roller or rollers previously described.

In hand-held scanning devices, it is generally desirable to completely seal the portion of the housing enclosing the optical components and electronics. The housing, sealed in this manner, prevents dust, moisture and other potential contaminants from entering the interior of the housing and contaminating the optical components and associated scanning device electronics.

Because the image beam from the object must pass through the housing to reach the optical components, a sealed housing, as described above, must be provided with a transparent window. This window is generally attached directly to the bottom wall of the scanning device housing.

During use and transport of a hand-held scanning device, the housing of the device is often subjected to physical stress. One example of a cause of such physical stress is when a user of the scanning device squeezes the housing while performing a scan. Since the housing may be formed of plastic, which is relatively flexible, this stress may cause relative movement to occur between various portions of the housing and between the housing and the scanning device optical assembly. Because the window portion is generally attached to the housing, this relative movement also often results in relative movement between the window assembly and the optical assembly. It has been found that such relative movement often results in misalignment of the window assembly with the optical assembly and, accordingly, results in degradation of the light beam entering the optical assembly.

Thus, it would be generally desirable to provide an apparatus which overcomes these problems associated with hand-held optical scanning devices.

SUMMARY OF THE INVENTION

The present invention is directed to a hand-held scanning device in which the scanning device housing window is attached directly to the optical assembly. In this manner, alignment between the window and the optical assembly may be maintained even when the housing is being subjected to stress.

The window is also designed to float with respect to at least a portion of the housing, thus allowing the housing to flex without causing movement of the window relative to the optical assembly. A tortuous path seal arrangement may be provided between the window and the housing. The tortuous path seal allows the housing to move relative to the window, and yet inhibits the entry of dust and other contaminants into the interior of the housing through the space provided between the window and the housing.

DETAILED DESCRIPTION OF THE INVENTION

Figure 1:
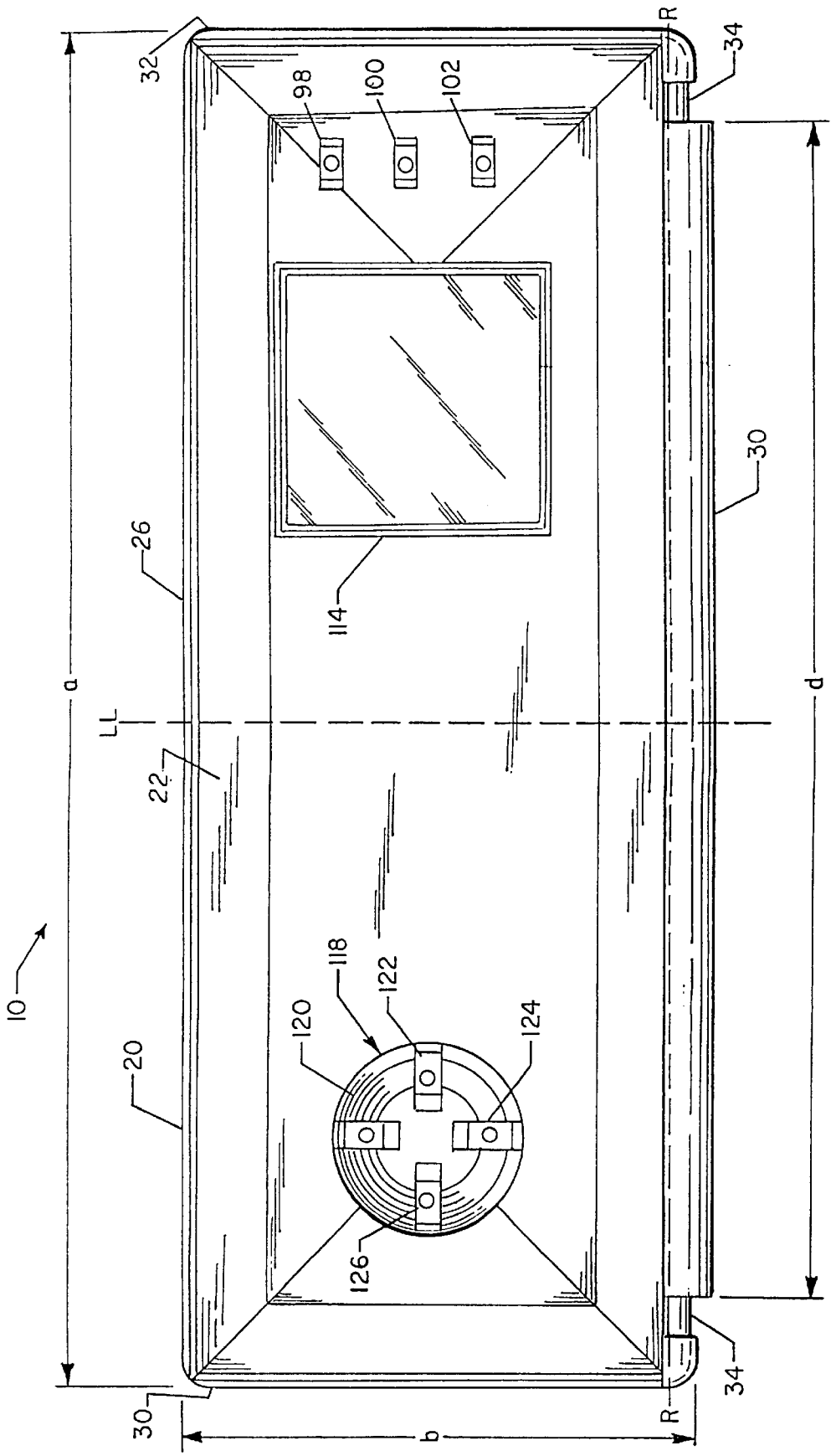
FIG. 1 is a front elevation view of a hand-held scanning device.

FIGS. 1–18, in general, illustrate a photoelectric imaging apparatus 10 in which a light path 56 extends between an object 54 which is to be imaged and a photosensor array 50. The imaging apparatus includes a housing assembly 20 defining a housing interior 21 located on the inside thereof and a housing exterior 23 located on the outside thereof; an optical assembly 40 including the photosensor array 50 and a plurality of optical components 42, 44, 46, 48 arranged along the light path 56, the optical assembly 40 located at least partially within the housing interior 21; an opening 25 in the housing assembly 20 extending between the housing interior 21 and the housing exterior 23, the light path 56 passing through the opening 25; a closure member 150 located in the opening 25 and including a window portion 152 located within the light path 56; and wherein the closure member 150 is attached to the optical assembly 40.

FIGS. 1–18 also illustrate, in general a photoelectric imaging apparatus 10 in which a light path 56 extends between an object 54 which is to be imaged and a photosensor array 50. The imaging apparatus includes a housing assembly 20 defining a housing interior 21 located on the inside thereof and a housing exterior 23 located on the outside thereof; an optical assembly 40 including the photosensor array 50 and a plurality of optical components 42, 44, 46, 48 arranged along the light path 56, the optical assembly 40 located at least partially in the housing interior 21; an opening 25 in the housing assembly 20 extending between the housing interior 21 and the housing exterior 23, the light path 56 passing through the opening 25; a closure member 150 movably retained in at least a portion of the opening 25 and including a window portion 152 located within the light path 56.

FIGS. 1–18 also illustrate, in general a photoelectric imaging apparatus 10 in which a light path 56 extends between an object 54 which is to be imaged and a photosensor array 50. The imaging apparatus includes a housing assembly 20 defining a housing interior 21 located on the inside thereof and a housing exterior 23 located on the outside thereof; an optical assembly 40 including the photosensor array 50 and a plurality of optical components 42, 44, 46, 48 arranged along the light path 56, the optical assembly 40 located at least partially in the housing interior 21; an opening 25 in the housing assembly 20 extending between the housing interior 21 and the housing exterior 23, the light path 56 passing through the opening 25; a closure member 150 spanning the opening 25; and a space 410 between the closure member 150 and the opening 25, the space 410 defining a tortuous path between the housing exterior 23 and the housing interior 21.

Having thus described the hand-held scanning device window assembly in general, the device will now be described in further detail.

FIG. 1 illustrates a hand-held scanning device 10. The scanning device 10 includes a housing 20 which may be a generally parallelepiped-shaped member having a generally flat front surface 22, a generally flat rear surface 24, FIG. 2, a generally flat top surface 26, FIG. 3; a generally flat bottom surface 28, FIG. 14; and generally flat opposite end surfaces 30, 32, FIG. 1. Housing 20 defines a housing interior 21, FIG. 14, located on the inside thereof and a housing exterior 23 located on the outside thereof. An opening 25 is located in the housing bottom surface 28 and extends between the housing interior 21 and the housing exterior 23. The scanning device 10 has a central axis LL, FIGS. 1, 3, 4, and 7–11.

It is to be understood that terms such as "front", "rear", "tops", "bottom", "horizontal" and "vertical" are used herein for illustration purposes only. In actual use, the scanning device 10 can be used in almost any orientation, thus making terms such as "front", "rear", "top", "bottom", "horizontal" and "vertical" relative to the orientation of the scanning device.

Figure 3:
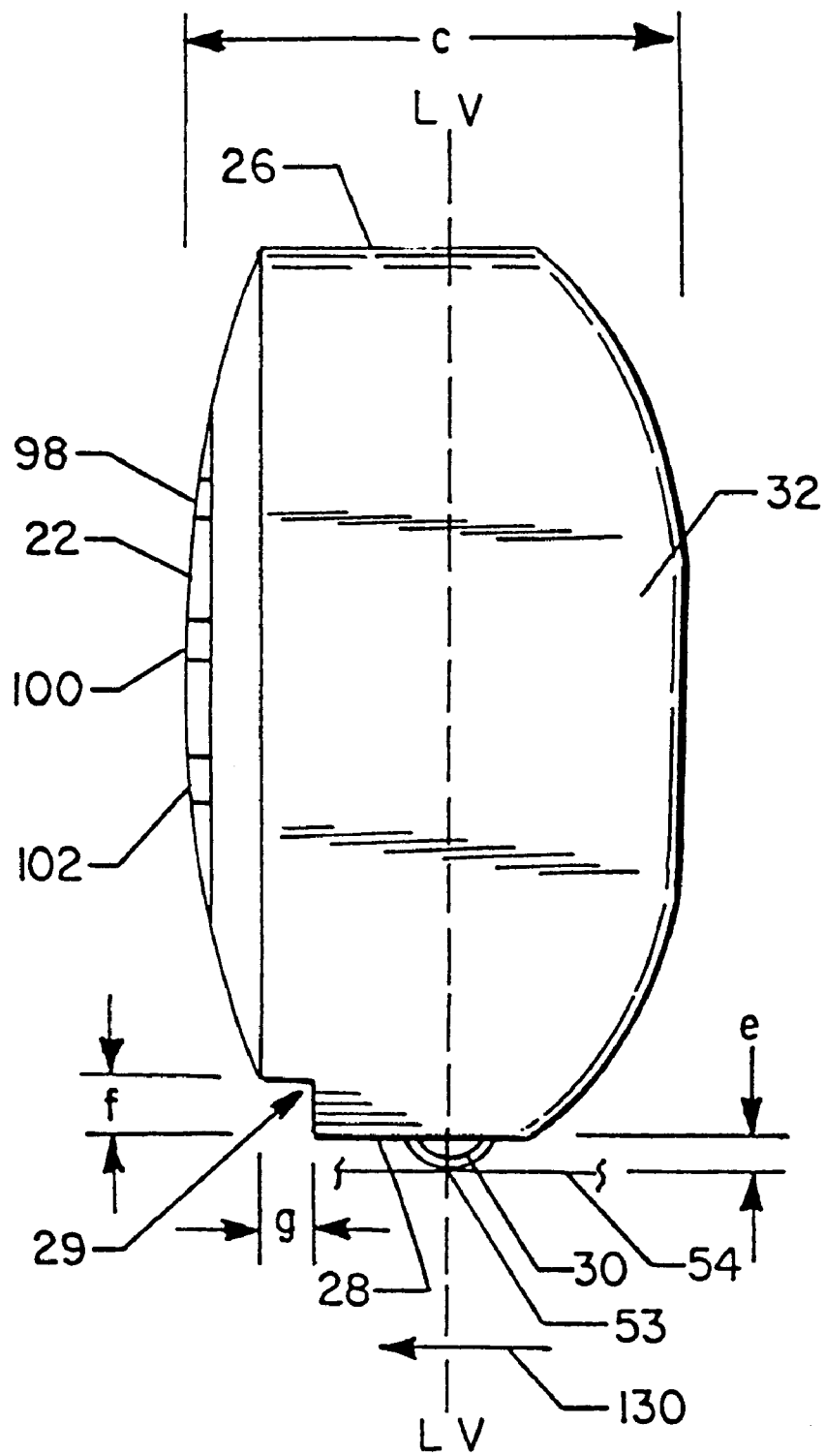
FIG. 3 is a side elevation view of the hand-held scanning device of FIG. 1.

Housing 20 may have a length "a" of, e.g., 9.5 inches, FIG. 1; a height "b" of, e.g., 3.75 inches, and a depth "c" of, e.g., 1.75 inches, FIG. 3.

Figure 4:
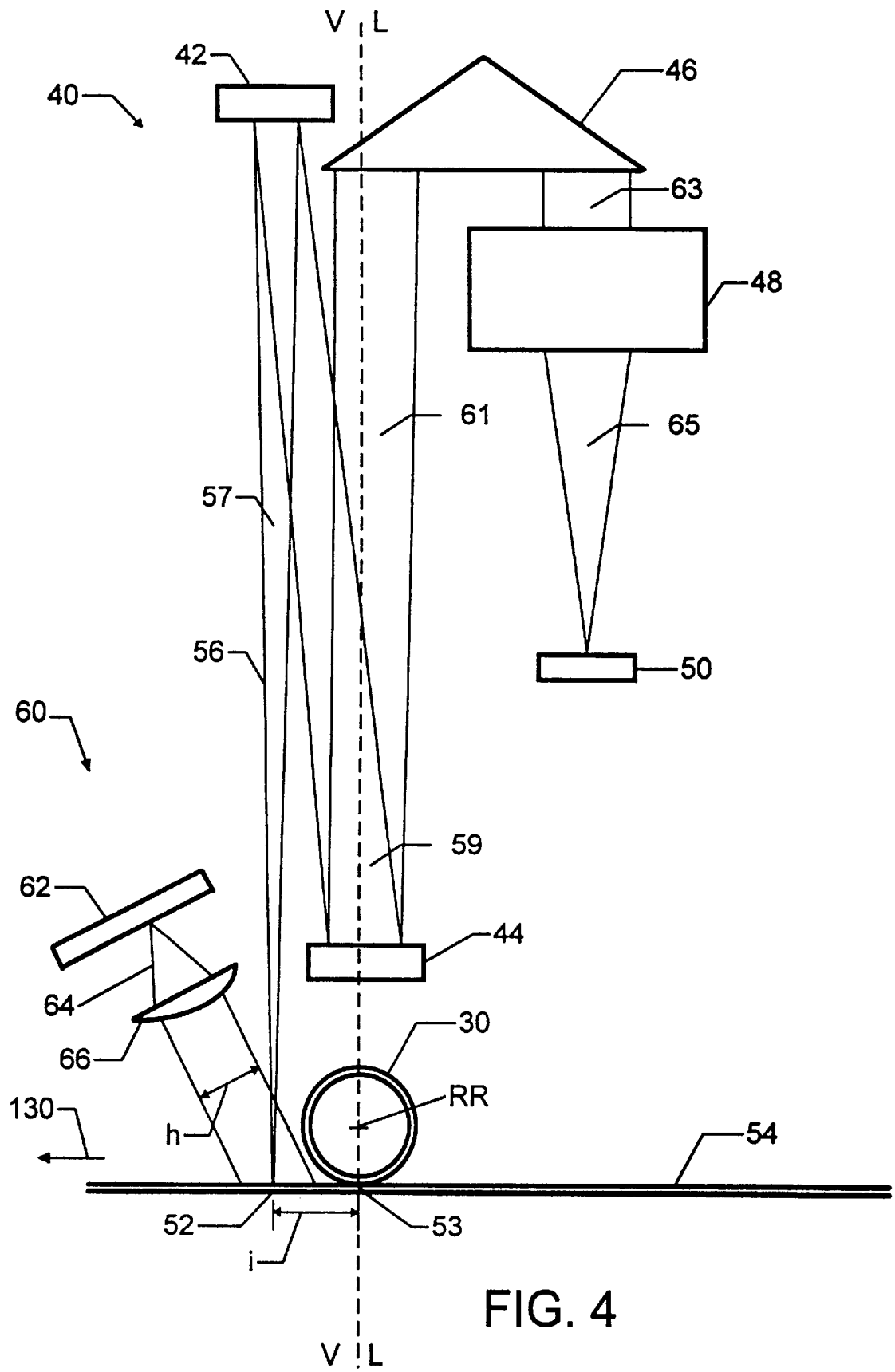
FIG. 4 is a schematic side elevation view of the optical system of the hand-held scanning device of FIG. 1.

Housing 20 contains an imaging assembly 40 as shown schematically in FIG. 4. Imaging assembly 40 may contain mirrors 42 and 44, a prism 46, and an imaging lens 48. These optical components fold and resize the image beam 56 and serve to focus a line portion 52 of a scanned object 54 onto a photosensor array 50 in a manner that is well-known in the art. A data signal 82, representative of scanned line images, is transmitted by photosensor array 50 to a microprocessor 80 which is located in housing 20, FIG. 5. Imaging assembly 40, FIG. 4, may be either a monochrome or a color imaging assembly as is well known in the art.

A light source 60 may also be provided in housing 20 as shown in FIG. 4. The light source 60 may include an LED (light emitting diode) board 62. LED board 62 generates light 64, in a well-known manner, approximately along the length "d" of the housing 20, FIG. 1. The light 64 is directed through a lens 66, FIG. 4, and then onto the scanned object 54. In this manner, the line portion 52 of the scanned object 54 is illuminated in order to allow image beam 56 to be generated.

Imaging assembly 40 may be configured in a vertical orientation (i.e., transverse to the plane of the scanned object 54) as shown in FIG. 4. The configuration of the mirrors 42 and 44, the prism 46 and the photosensor array 50 cause the imaging light beam 56 to be folded into a plurality of substantially vertically extending portions 57, 59, 61, 63, 65, rather than horizontally extending portions. The length of portion 57 may be about 80 mm; the length of portion 59 may be about 59 mm; the length of portion 61 may be about 54 mm; the length of portion 63 may be about 3 mm; and the length of portion 65 may be about 20 mm. The length of the light beam within the prism 46 may be about 18 mm and the length of the light beam within the lens 48 may be about 6 mm. The lengths described above result in the overall length of imaging light beam 56 being approximately 240 mm. Due to the configuration described above, at least 80% of the light path 56 will extend in a substantially vertical direction, i.e. a direction perpendicular to the object 54 at the location of the line portion 54.

This arrangement causes the height "b", FIG. 1 of the scanning device housing to be greater than its depth "c", FIG. 3. It has been found that this configuration of the housing allows easy grasping by a human hand and thus facilitates ease of use during a scanning operation. In a preferred embodiment, the housing height "b" may be at least about twice the housing depth "c".

Referring again to FIG. 5, housing 20 may also contain a memory storage device 90, FIG. 5. The memory storage device 90 is connected to microprocessor 80 by a connection 92. The memory storage device 90 serves to store images of scanned objects acquired by the hand-held scanning device 10. Memory storage device 90 may be a solid state memory device, capable of storing data equivalent to approximately fifty 8.5 inch by 11 inch pages of text. Memory storage device 90 may, alternatively be constructed as an integral part of microprocessor 80, rather than as a separate unit.

Figure 2:
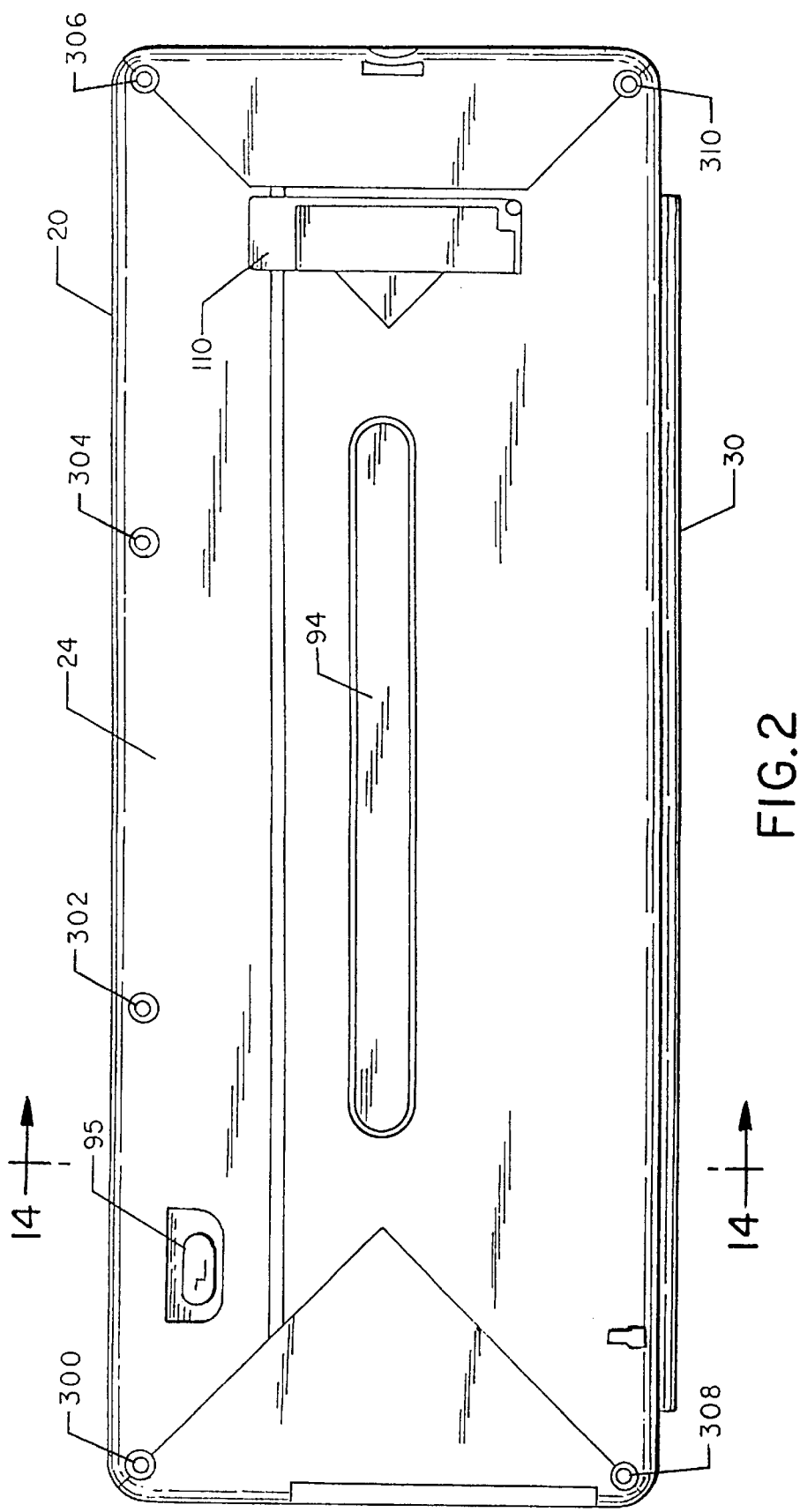
FIG. 2 is a rear elevation view of the hand-held scanning device of FIG. 1.

A scan button 94 is located on the rear surface 24 of housing 20, FIG. 2. Scan button 94 is connected to microprocessor 80 as illustrated by reference numeral 96 in FIG. 5. Scan button 94 is configured so as to be operable by a user when performing a scanning operation. Depressing scan button 94 causes microprocessor 80 to carry out a scanning operation.

Figure 5:
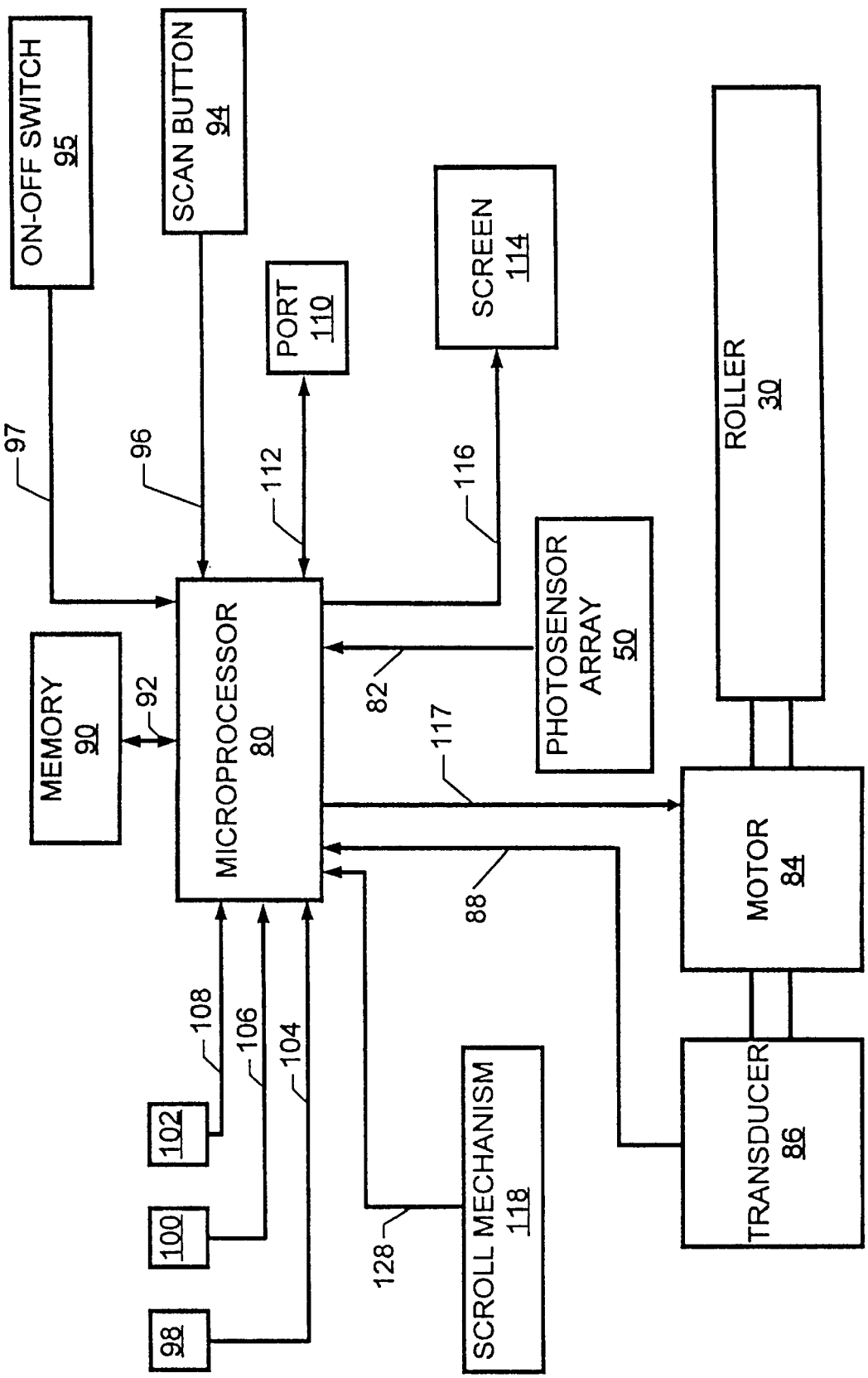
FIG. 5 is a schematic illustration showing the relationship between various functional components of the hand-held scanning device of FIG. 1.

An on-off switch 95 may be provided on the rear surface 24 of housing 20, FIG. 2. On-off switch 95 serves to power the hand-held optical scanning device 10 on and off in a conventional manner and may be connected to microprocessor 80 by a connection 97 as illustrated in FIG. 5.

Function buttons 98, 100, 102 may be located on the front surface 22 of housing 20 as shown in FIG. 1. The function buttons 98, 100, 102 allow a user of the handheld scanning device 10 to communicate with the microprocessor 80 in order to accomplish such functions as a user interface for file management, image editing, etc. Function buttons 98, 100, 102 are connected to microprocessor 80 as indicated by reference numerals 104, 106, 108 respectively, FIG. 5.

An input-output port 110 may be located on the rear surface 24 of housing 20, FIG. 2. Input/output port 110 is connected to microprocessor 80 as shown schematically by reference numeral 112 in FIG. 5. Input/output port 110 allows image data acquired by the hand-held scanning device 10 and/or stored by the microprocessor 80 and the memory storage device 90 to be transmitted or "downloaded" to a computer or other data-handling device. Input/output port 110 may be a physical connection device such as an industry standard "IEEE-1284" type connector or may be a non-contact connection apparatus such as an infrared communication port.

A screen 114, FIG. 1, may be provided on the front surface 22 of housing 20 for displaying images of objects that are being scanned and also for displaying images of previously scanned objects that are stored by microprocessor 80 and/or memory device 90. Screen 114 is connected to microprocessor 80 by connection 116, FIG. 5. Screen 114 may be used to display images that have been previously scanned and stored in microprocessor 80 and/or memory device 90. In this manner, the user of hand-held scanning device 10 can ensure that desired scan objects have been adequately captured before downloading the images to a computer or other data handling device.

Screen 114 may also be used to display status information generated by the microprocessor 80. Additionally, screen 114 may be used to display menu information affording a user access to various scanning-related functions provided by the microprocessor 80.

Screen 114 may be a liquid crystal display (LCD) type screen of well known configuration. Such an LCD screen may be of the type commonly known in the industry as a reflective STN display. Screen 114 may have dimensions of approximately 2 inches by 2 inches.

A scroll mechanism 118 may be provided on the front surface 22 of housing 20, FIG. 1. Scroll mechanism 118 may be provided with direction buttons 120, 122, 124 and 126 which may be activated by a user to scroll images displayed on the screen 114. Scroll mechanism 118 may also be used to move a curser or other pointer on the screen 114 to accomplish various functions as is well known. Scroll mechanism 118 is connected to microprocessor 80 by connection 128, FIG. 5.

To allow the hand-held scanning device 10 to be moved across an object 54 that is to be scanned, a roller 30 may be provided on the bottom surface 28 of housing 20, FIGS. 1–3. The roller 30 may be rotatably mounted in the housing 20 by axle portions 32 and 34, FIG. 1. Mounted in this manner, the roller 30 is rotatable about the roller axis RR, FIGS. 4, 9 and 10. The roller axis RR intersects the imaging device central axis LL. Roller 30 may have a length "d", FIG. 1, of, e.g., 8 inches and an outside diameter of, e.g., 0.5 inches. Roller 30 may be constructed having a metal core covered by an elastomeric coating.

Referring to FIG. 5, the roller 30 may be connected to a drive motor 84 which turns the roller 30 and thus drives the scanning device 10 along an object to be scanned 54 while a scan is being performed. A transducer 86 may be connected to the motor 84. Transducer 86 sends a signal 88 to microprocessor 80 which is indicative of the speed and displacement of the roller 30. In this manner, the microprocessor can determine the displacement of the hand-held scanning device 10 during a scanning operation in order to correlate data signal 82 from the photosensor array 50 to the proper location on the scanned object 54. Microprocessor 80 controls the activation and the speed of the motor 84 via a connection 117.

A battery, not shown, may also be provided within the housing 20 to provide power for the hand-held optical scanning device 10 in a conventional manner. The battery may be rechargeable as is well known. Alternatively, the scanning device 10 may be powered by an external power source via, e.g., a power cord.

Figure 6:
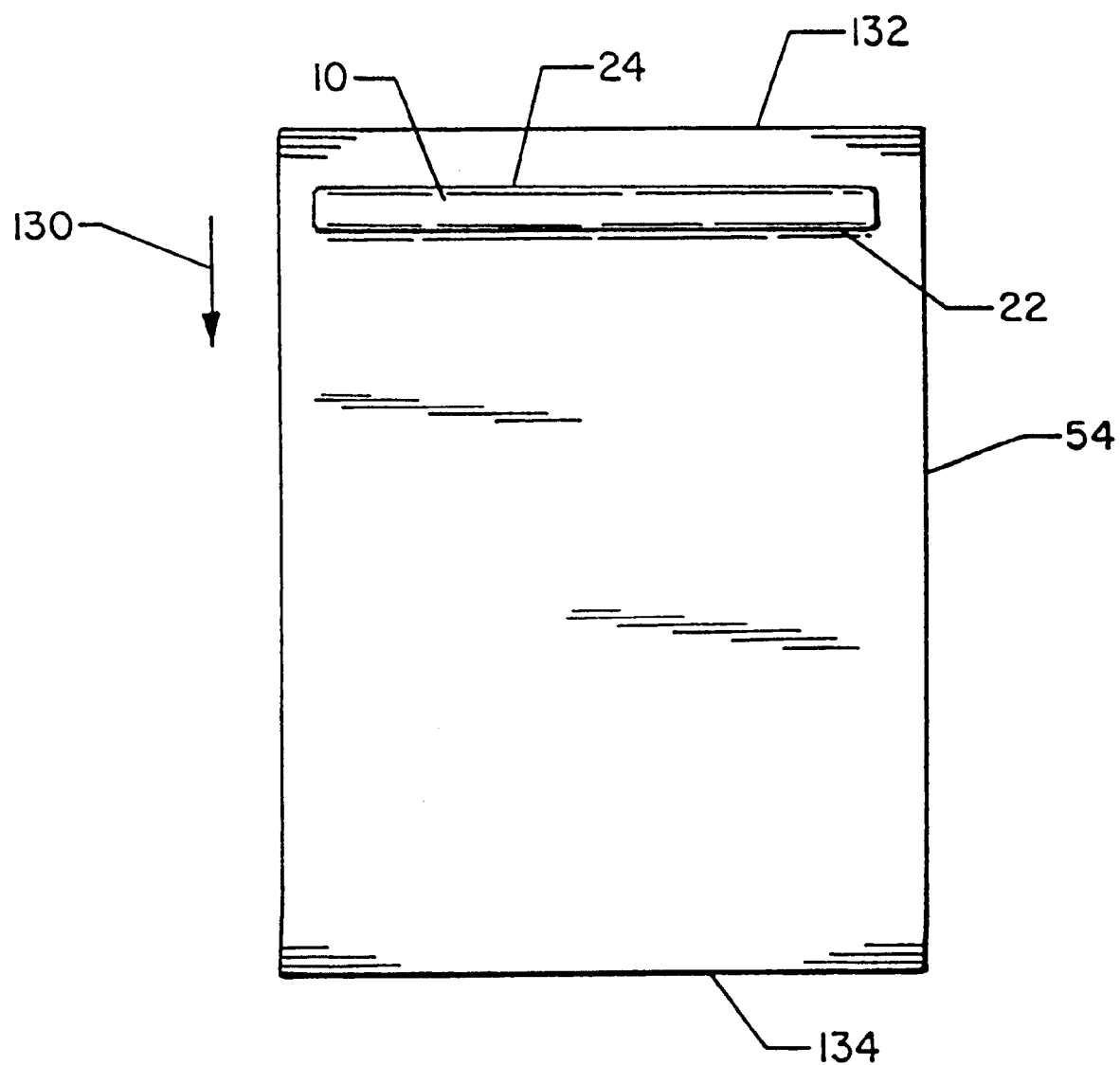
FIG. 6 is a schematic illustration showing the handheld scanning device of FIGS. 1–5 being used to scan an object.

FIG. 6 shows the hand-held scanning device 10 positioned to begin a scan of an object 54 such as a document. Document 54 may be, for example an 8½ inch by 11 inch page of text. To scan the document 54, the scanning device 10 is first located at one end 132 of the document 54 with the roller 30 of the scanning device 10 resting on the document 54. The user then depresses scan button 94 and holds it down while the scanning device 10 moves across the document 54 in the scanning direction 130. As the scanning device is moved, imaging assembly 40 images line portions of the scanned object onto photosensor array 50 which, in turn, sends signal 82 indicative of the scanned line portions to the microprocessor 80. Photosensor array 50 transmits signal 82 representing line images of the object being scanned each time a sampling interval occurs as is well-known. A typical sampling interval may be, for example, 1/300th of an inch. When the scanning device 10 reaches the opposite end 134 of the document 54, the user may release the scan button 94 causing the scanning device 10 to halt its movement.

The hand-held scanning device 10 is configured so that contact with the object to be scanned 54 occurs only along a single line 53, FIG. 4. This line is transverse to the scanning direction 130, FIG. 6, and is defined by the roller 30, located on the bottom portion of the scanning device. The scanning device 10 is, thus, fully supported by the single roller 30 when performing a scan. Because the scanning device 10 is supported by only one roller, the imaging assembly 40 of the scanning device 10 may be moved very close to the edge of the object 54 while remaining fully supported. The hand-held scanning device 10 is able, therefore, to capture substantially all desired features of an object to be scanned (e.g., a page of printed text) while remaining fully supported.

The use of such a single roller configuration also allows a user to view the area being scanned by the hand-held scanning device 10 while a scan is being performed. Because the illumination light 64 is not hidden beneath the scanner structure, a user may view this light on the object 54 while the scan is being performed. This ability to view the illumination light 64 allows a user to determine what portion of the object 54 is being scanned by the scanning device 10. In this manner, the user can ensure that all desired features, e.g., text, on the object 54 are scanned.

Figure 7:
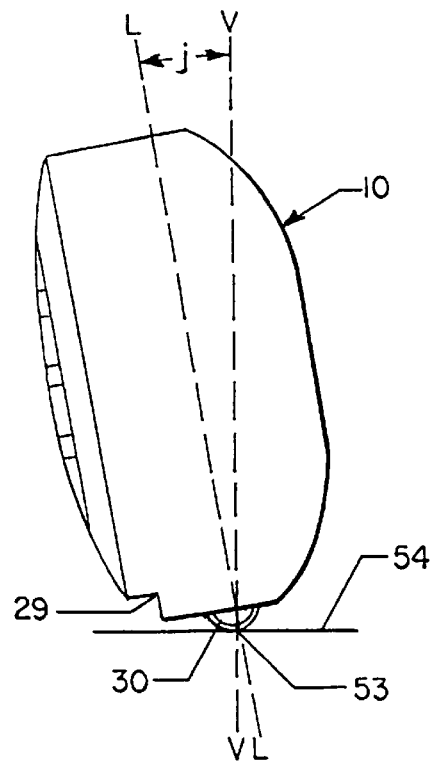
FIG. 7 is a side elevation view of the hand-held scanning device of FIG. 1 in a tilted forward position.
Figure 8:
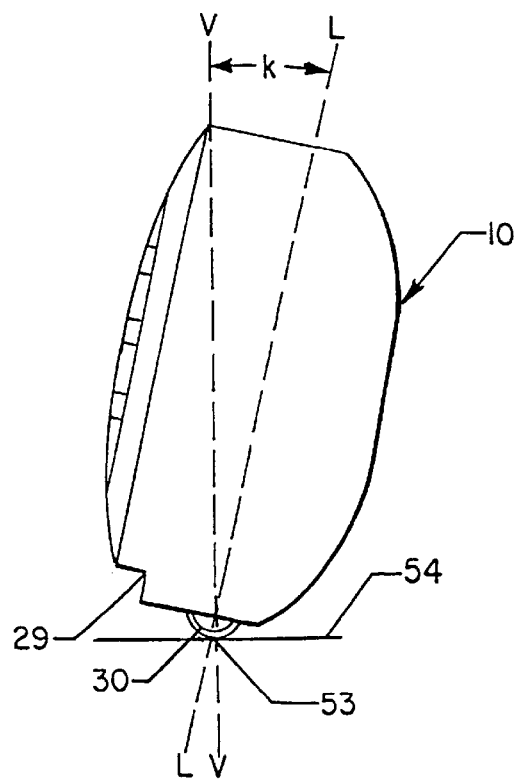
FIG. 8 is a side elevation view of the hand-held scanning device of FIG. 1 in a tilted rearward position.

To facilitate viewing of the illuminated scan area by a user, a notch 29 may be provided in the front and bottom surfaces 22, 28 of the hand-held scanning device, FIGS. 3, 7, 8. The notch 29 allows a user of the scanning device an unobstructed view of the area being scanned. Notch 29 may have a height "f" of, e.g., 0.22 inches, and a depth "g" of, e.g., 0.28 inches, FIG. 3.

Because the hand-held scanning device 10 is provided with only one roller, a user may inadvertently tilt the scanning device forward and backward while a scan is being performed. Referring to FIGS. 7 and 8, a normal plane VV is defined by the roller axis RR and the contact line 53 between the roller 30 and the object 54. In the case of a planar object, e.g., the object 54 shown in FIGS. 7 and 8, the normal plane VV will always be perpendicular, or normal, to the plane of the object. Often, however, objects to be scanned are not planar. One example of such a non-planar object is an open book, in which the page to be scanned might assume a curved profile.

Figure 11:
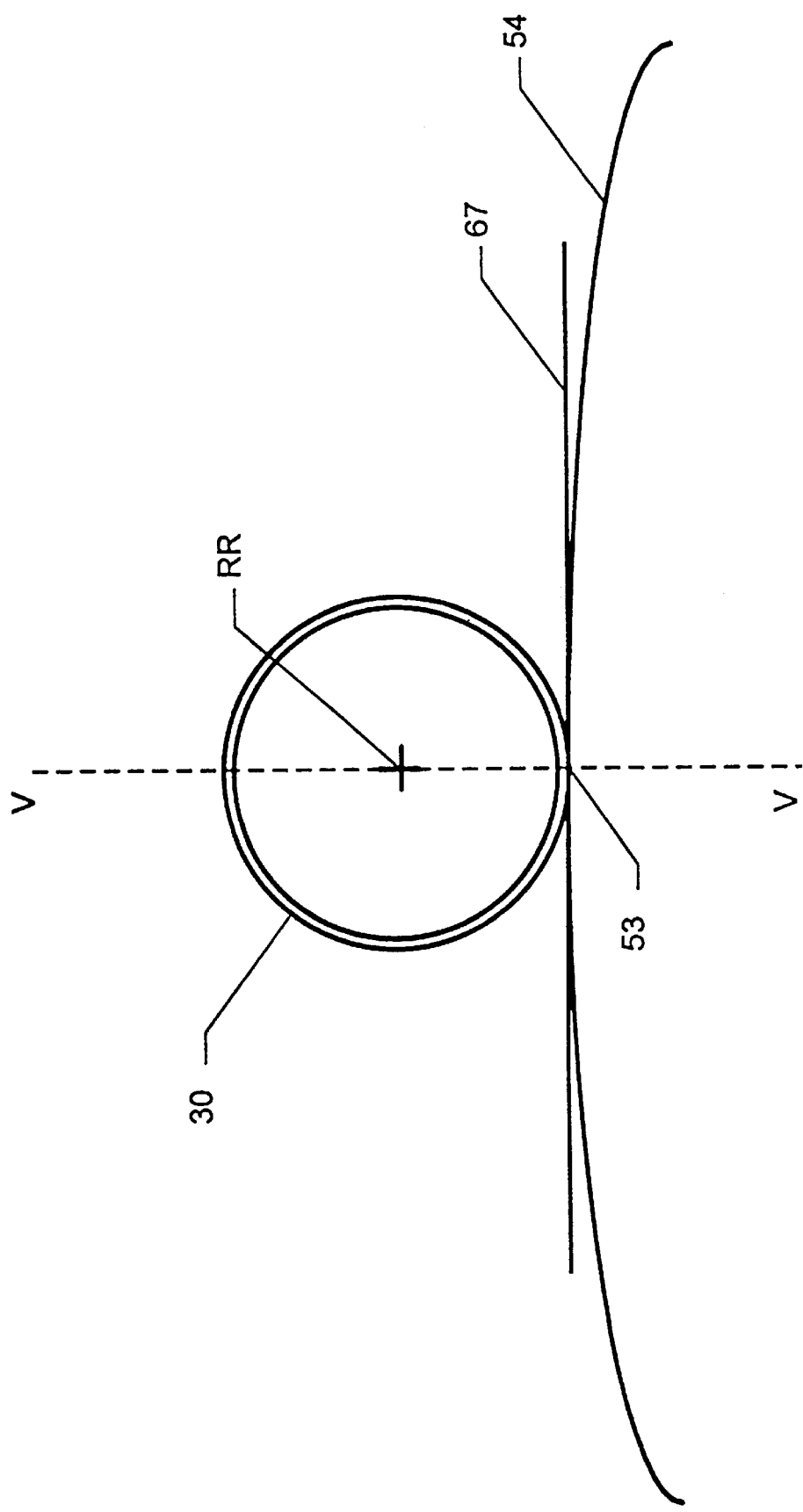
FIG. 11 is a schematic illustration of the hand-held scanning device of FIG. 1 scanning a curved surface of an object.

FIG. 11 schematically illustrates an example of an object 54 having a non-planar profile. In such a case, the normal plane VV is still defined by the roller axis RR and the contact line 53 as shown. The normal plane VV is also perpendicular to a tangent plane 67 which is parallel to the tangent of the outer surface of roller 30 at the contact point 53. In the case of a planar object 54 as shown in FIGS. 7 and 8, the tangent plane 67 will be coincident with the plane of the object 54.

Figure 9:
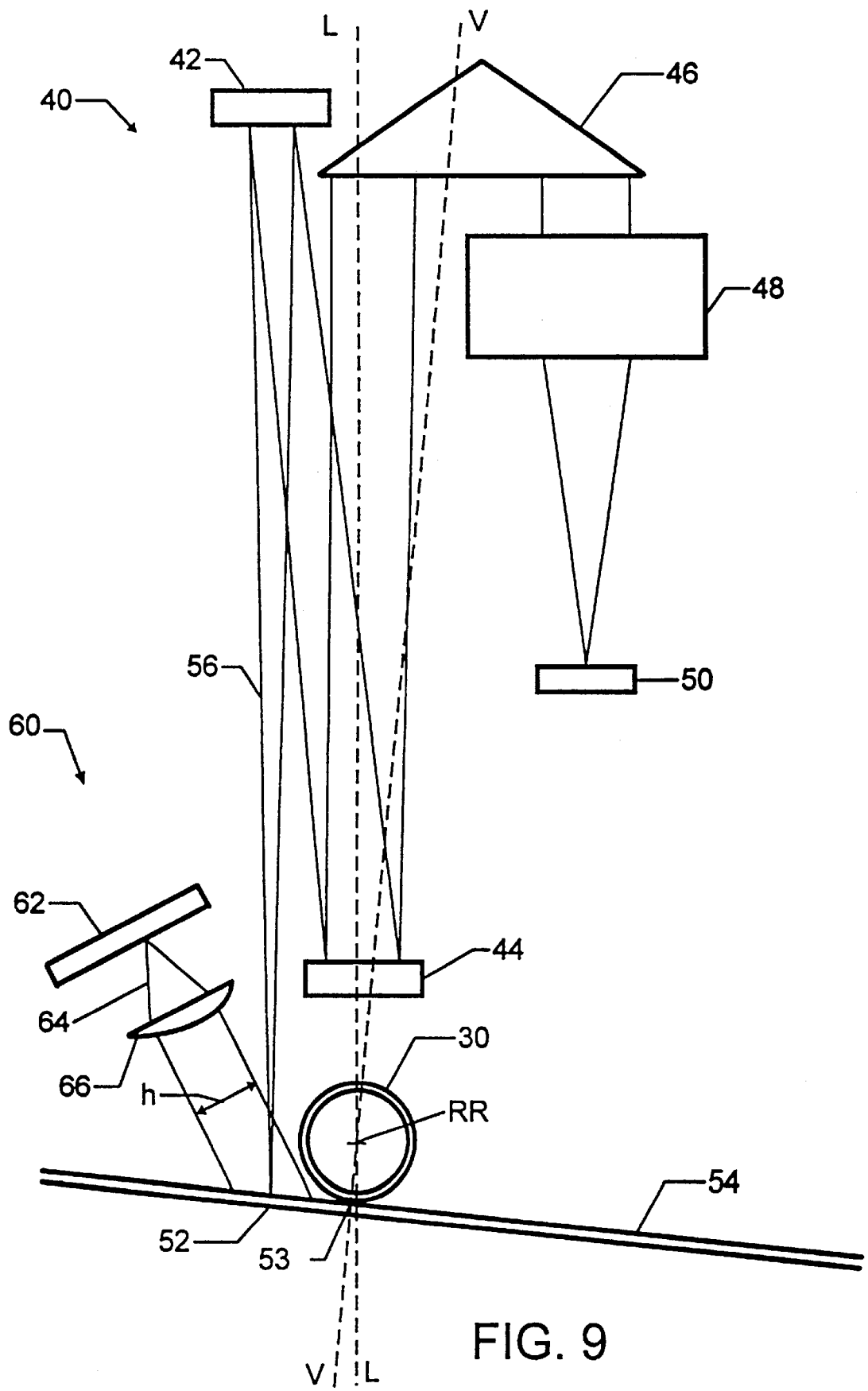
FIG. 9 is a schematic side elevation view of the optical system of the hand-held scanning device of FIG. 1 in a tilted forward position.
Figure 10:
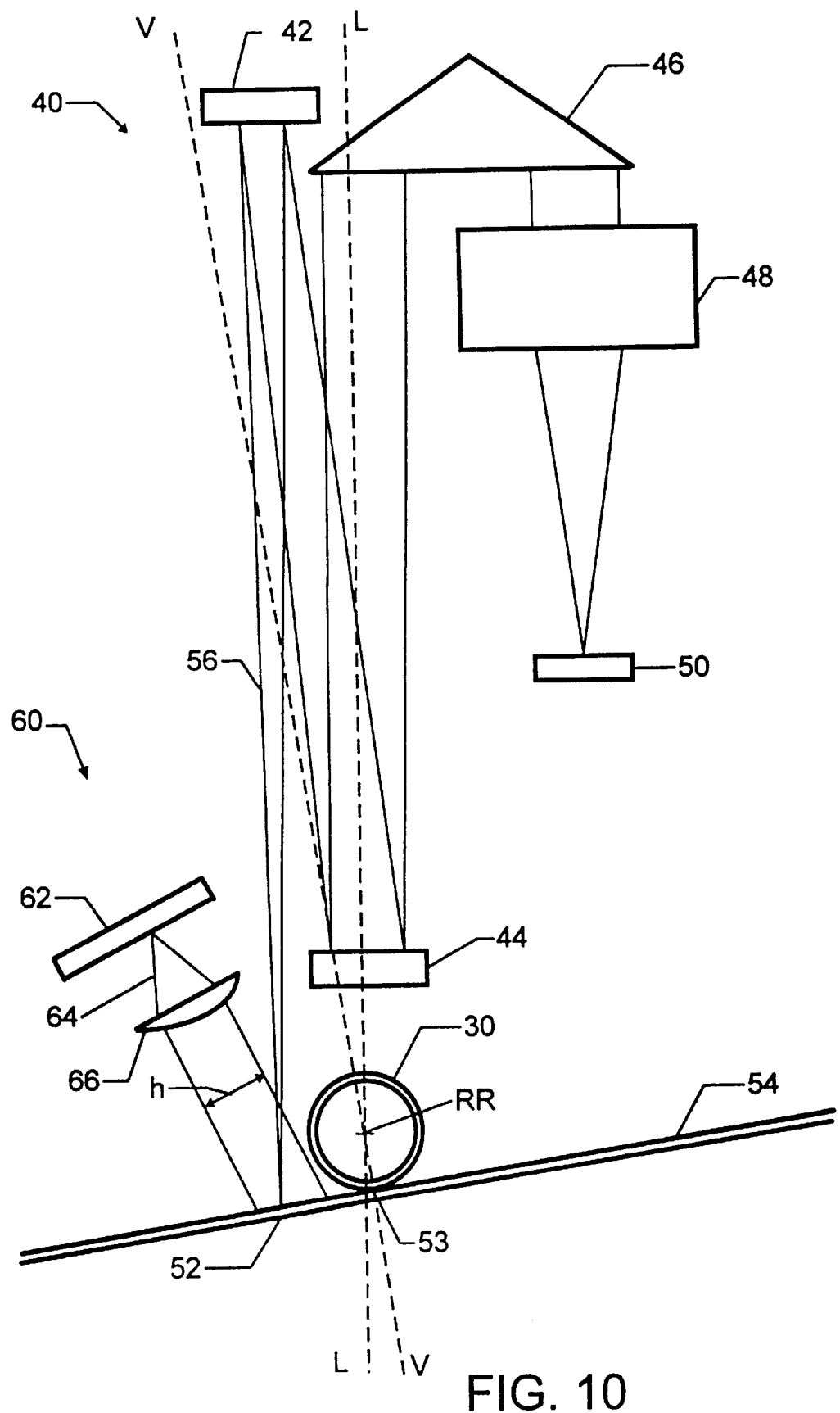
FIG. 10 is a schematic side elevation view of the optical system of the hand-held scanning device of FIG. 1 in a tilted rearward position.

FIG. 7 shows the hand-held scanning device 10 in a tilted forward configuration in which the axis LL of the scanning device 10 is inclined "j" degrees forwardly of the normal plane VV. FIG. 8 shows the hand-held scanning device 10 in a tilted backward configuration in which the axis LL of the scanning device is inclined "k" degrees rearwardly of the normal plane VV. FIGS. 9 and 10 schematically illustrate the effect of forward and rearward tilting, respectively, on the imaging assembly 40. FIG. 4 schematically illustrates the imaging assembly 40 when the hand-held scanning device 10 is in a non-tilted configuration in which the axis LL of the scanning device lies within the normal plane VV.

It has been determined that a typical user is easily able to perform a scan with the hand-held scanning device 10 without tilting the device more than an angle "j" of 10 degrees forwardly or more than an angle "k" of 10 degrees rearwardly of the normal plane VV. Accordingly, the scanning device is designed to accommodate such tilting during a scanning operation without significant degradation of acquired image quality as will now be explained in detail.

The scanning device 10 is constructed to ensure that no portion of the housing 20 will contact the scanned object 54 when the device is tilted up to 10 degrees from the normal plane VV in either direction. To accomplish this, the roller 30 is configured to protrude a sufficient distance beneath the bottom surface 28 of the housing 20, FIG. 3. It has been found, for example, that locating the outer circumference of the roller 30 a distance "e" of at least about 0.125 inches below the bottom surface 28 of housing 20 is sufficient for this purpose.

As can be seen from FIG. 9, when the scanning device 10 is tilted forward (i.e., in the scanning direction 130), the effective distance between the lens 48 and the line portion 52 on document 54 becomes shorter. Conversely, as can be seen from FIG. 10, when the scanning device 10 is tilted backward (i.e., opposite to the scanning direction 130), the effective distance between the lens 48 and the line portion 52 on document 54 becomes longer. Accordingly, the line portion 52 tends to move out of the focus of lens 48 as the scanning device 10 is tilted.

To solve this problem, the scanning device 10 may be provided with a lens 48 having a relatively high f-number. As is well-known, a lens with a higher f-number will have a greater depth of field than a lens with a lower f-number. Accordingly, the use of a higher f-number lens enables the hand-held scanning device 10 to keep the line image 52 adequately in focus throughout the tilting movements described above. It has been found that a lens having an f-number of at least about 4 and a depth of field of at least about 0.20 inches is sufficient to keep the line portion 52 in adequate focus throughout tilting movements of up to about 10 degrees from the normal plane VV. Preferably, the lens 48 has an f-number of about 4 and a depth of field of about 0.20 inches. Because a higher f-number lens tends to capture less light, a more sensitive photosensor array 50 may be used in the scanning device 10. In one example, a photosensor array having a signal to noise ratio of about 60:1 may be used.

To further minimize the adverse effects of tilt on acquired image quality, the hand-held scanning device 10 is configured so as to minimize the distance "i" between the roller contact line 53 and the line portion 52, FIG. 4. As best illustrated in FIGS. 9 and 10, when the scanning device 10 is tilted, as described above, it rotates about the roller rotation axis RR. Accordingly, the longer the distance "i", the greater will be the defocusing relative movement between the line portion 52 of the object to be scanned 54 and the photosensor array 50. Conversely, minimizing the distance "i", reduces this defocusing effect. It has been found that maintaining the distance "i" at about 0.30 inches or less serves to adequately minimize the de-focusing effect.

Another problem caused by the tilting described above is that the line image tends to move out of the illumination light 64 as the scanning device is tilted. As illustrated in FIG. 9, when the scanning device 10 is tilted forwardly, the line portion 52 moves closer to the contact line 53 between the roller 30 and the object 54. Conversely, as illustrated in FIG. 10, when the scanning device 10 is tilted rearwardly, the line portion 52 moves further away from the contact line 53. Thus, if a conventional relatively narrow-width illumination light were used in the hand-held scanning device 10, the line portion 52 would move out of the lit area when tilted. This would result in degradation of the image acquired by the scanning device 10 since illumination of the line portion 52 is necessary for optimum acquired image quality.

To ensure adequate illumination of the line portion 52 while tilting, the scanning device 10 may be provided with a relatively wide illumination light beam 64 as shown in FIGS. 4, 9 and 10. The width of this light beam is determined by the configuration of the lens 66. In this manner, a wider area on object 54 is illuminated and the line portion 52 remains illuminated even when the scanning device 10 is being tilted forwardly as shown in FIG. 9 and rearwardly as shown in FIG. 10. It has been found that providing an illumination light having a width "h" of about 0.160 inches is sufficient to compensate for a scanning device tilt of up to about 10 degrees from the normal plane VV.

A further problem caused by the tilting of hand-held scanning device 10 is that the magnification of the line portion 52 is affected. When the scanning device 10 is tilted, the object 54 is no longer perpendicular to the image beam 56, as best illustrated in FIGS. 9 and 10. Accordingly, portions of the line portion 52 will be closer to the photosensor array 50 than will other portions. This results in the closer portions being magnified to a lesser extent than the further portions and the image of the closer portions focused on photosensor array 50 being smaller than the image of the further portions, thus resulting in some degradation of the quality of the image acquired by the scanning device 10.

It has been found, however, that the image degradation associated with magnification is relatively negligible and need not be corrected when the scanning device 10 is tilted not more than about 10 degrees from the normal plane VV during use. If, however, it is desired to enhance acquired image quality or to compensate for tilting of the scanning device 10 greater than 10 degrees from the normal plane VV, then a type of lens known as a "telecentric lens" may be used in place of the lens 48 previously described. Telecentric lenses are commonly used in the photolithographic industry and are configured to eliminate the variations in magnification caused by distance variation due to tilting, as described above, in a well-known manner.

Although the hand-held scanning device 10 has been described having a single roller 30, it is to be understood that a multi-part roller could alternatively be provided in which the axes of rotation of the roller parts are colinear. Such a configuration would provide for line contact between the scanning device and the object being scanned as described above.

As a further alternative, the roller 30 previously described could be replaced with a slide mechanism which allows sliding, rather than rolling, movement of the scanning device 10 across the object to be scanned 54 and which also provides for substantially line contact between the scanning device and the object to be scanned.

Figure 12:
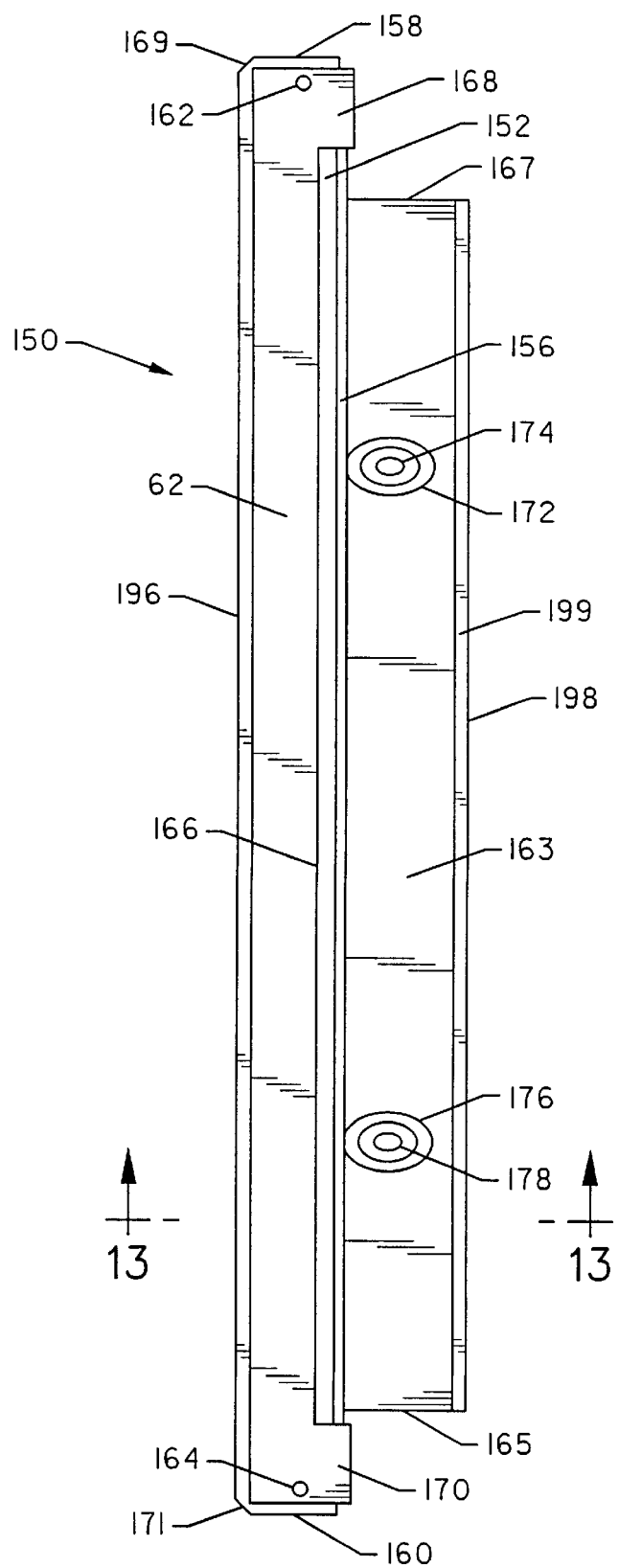
FIG. 12 is a top plan view of a window assembly for the hand-held scanning device of FIG. 1.
Figure 13:
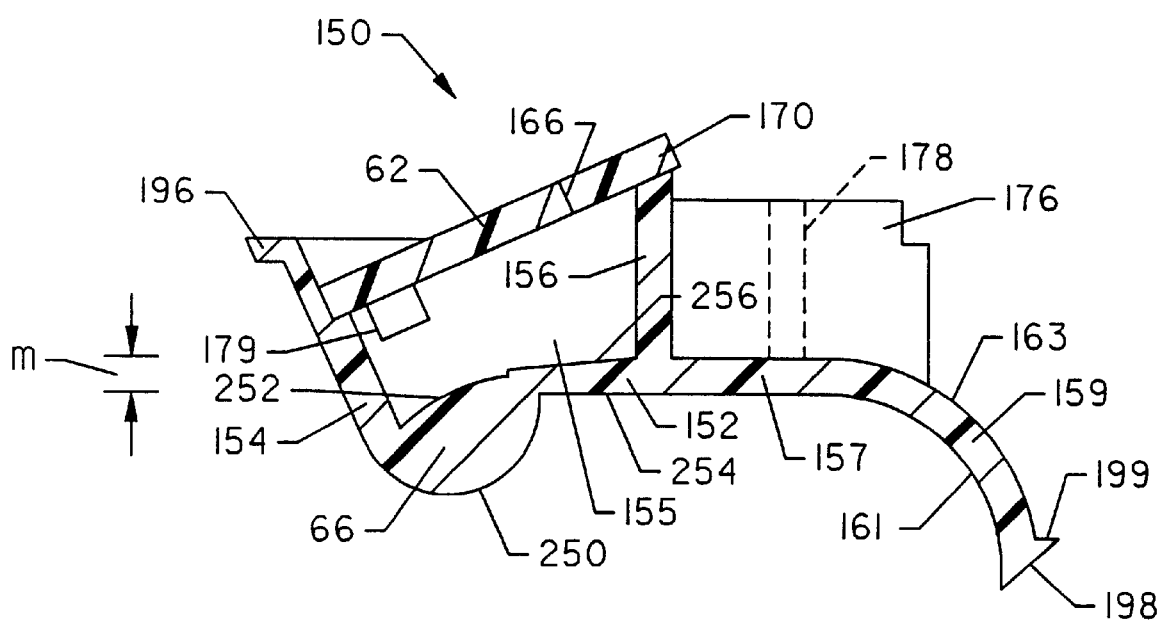
FIG. 13 is a cross-section view of the window assembly of FIG. 12 taken along the line 13—13 in FIG. 12.
Figure 14:
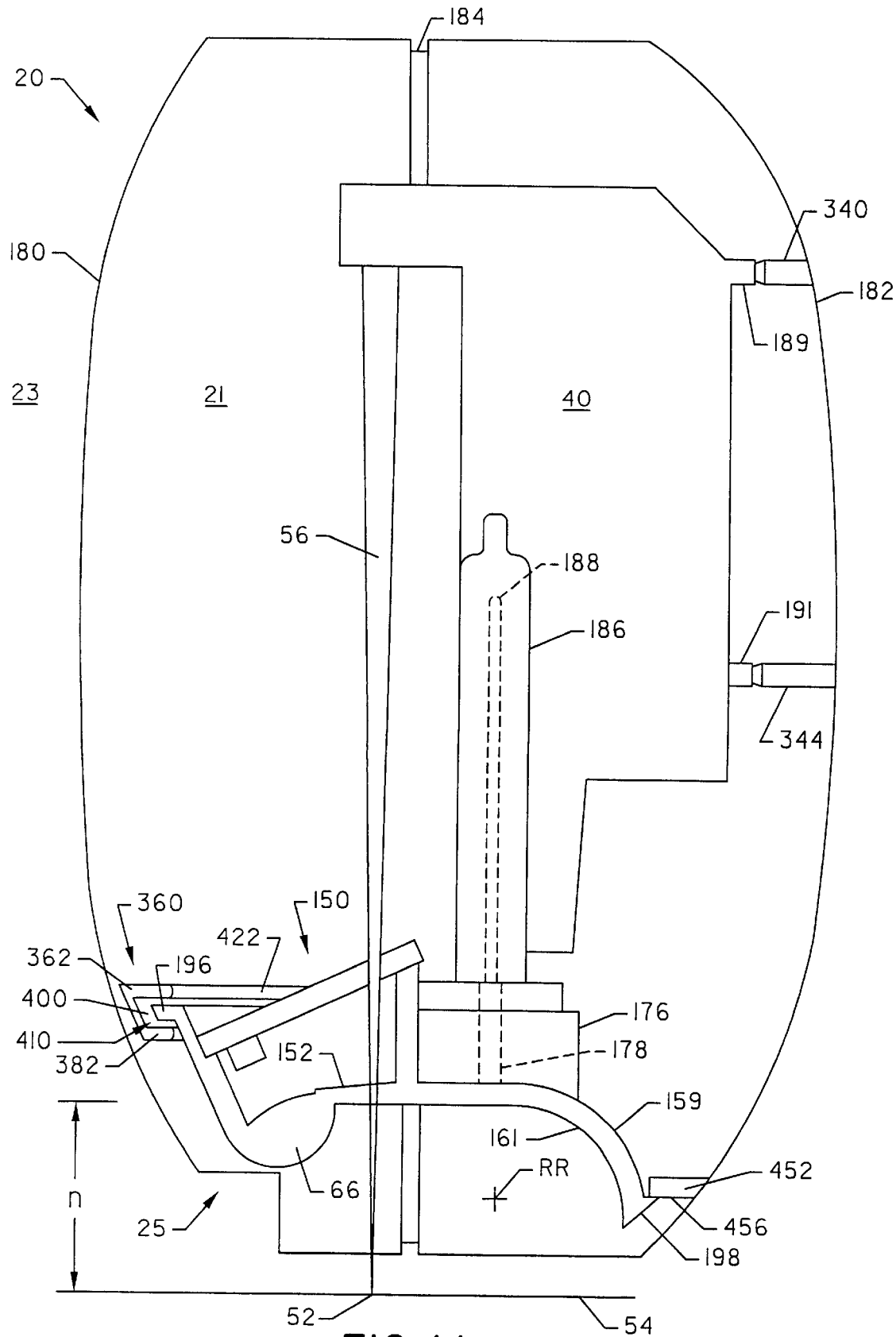
FIG. 14 is a cross-section view of the hand-held scanning device of FIG. 1 showing the mounting of the window assembly of FIG. 12, taken along the line 14—14 of FIG. 2.

FIGS. 12 through 14 illustrate a window assembly 150 which may be used to seal the scanning device housing 20 by spanning the housing opening 25 and, thus, prevent dust, moisture and other potential contaminants from entering the interior of the housing 20 and contaminating the optical components of the imaging assembly 40, FIGS. 4, 9 and 10, and associated scanning device electronics.

Referring to FIGS. 12 and 13, window assembly 150 may be integrally constructed to include both the light source lens 66, FIG. 12, as previously described, and a transparent window portion 152. Transparent window portion 152 allows unobstructed passage of the imaging beam 56 from the line image 52 to the imaging system 40, as best shown in FIG. 14, while effectively sealing the scanning device housing opening 25 to prevent the entry of dust, moisture, and other contaminants.

Window assembly 150 may include a front wall portion 154, FIG. 13. The lens 66 may be located immediately adjacent the front wall portion 154 and may include a first curved surface 250 and a second substantially flat surface 252 which may be substantially perpendicular to the front wall portion 154. Window portion 152 may be located immediately adjacent lens 66 and may include substantially parallel first and second surfaces 254, 256. Located immediately adjacent window portion 152 is a rear wall portion 156 which may extend substantially perpendicular to the window portion 152.

A first sidewall portion 155, FIG. 13, may be located at one end of the window assembly 150 and extend between the front wall portion 154, lens 66, window portion 152 and rear wall portion 156. In a similar manner, a second sidewall portion, not shown, may be located at the opposite end of the window assembly 150 and extend between the front wall portion 154, lens 66, window portion 152 and rear wall portion 156.

Front edge member 196 may project outwardly from the front wall portion 154 as shown, for example, in FIG. 13. A first side edge member 158, FIG. 12, may extend outwardly from the first sidewall portion 155, FIG. 13 and a second side edge member 160, FIG. 12 may extend outwardly from the second sidewall portion. First side edge member 158 may be joined to the front edge member 196 by a first beveled portion 169. In a similar manner, second side edge member 160 may be joined to the front edge member 196 by a second beveled portion 171.

A linear wall portion 157, FIG. 13, may extend rearwardly from the juncture of the window portion 152 and the rear wall 156. Linear wall portion 157 may transition into a curved wall portion 159. Curved wall portion 159 may include a convexly curved lower surface 161 and a concavely curved upper surface 163 and may terminate at oppositely disposed curved end portions 165, 167, FIG. 12, which each extend between the lower curved surface 161 and the upper curved surface 163. A lip portion 198, including an upwardly facing surface 199, may be located adjacent curved wall portion 159 as shown, for example, in FIGS. 12 and 13.

Mounting blocks 172, 176 may be located immediately adjacent the rear wall 156, linear wall portion 157 and the curved wall portion upper surface 163 in the locations shown, e.g., in FIG. 12. The window assembly front wall portion 154, lens 66, window portion 152, rear wall portion 156, linear wall portion 157, curved wall portion 159 and the mounting blocks 172, 176 as described above may all be integrally formed.

The LED board 62, as previously described, may also be configured as an integral part of the window assembly 150. LED board 62 may be supported by window assembly 150 front and rear wall portions 154, 156, FIG. 13, and side wall portions 158, 160, FIG. 12. As best shown in FIG. 12, the LED board 62 may be secured to the remainder of the window assembly 150 by screws 162, 164 which may engage threaded openings, not shown, in the sidewall portions 158, 160 in a conventional manner. Alternatively, the LED board may be secured by gluing or by any other appropriate mechanism. LED board 62 contains a light source 179, FIG. 13, which, when the LED board is mounted as described above, aligns with the lens 66. When attached to the window assembly 150 as described above, the LED board 62 is substantially parallel to the lens surface 252 as shown in FIG. 13.

Attaching the LED board directly to the window assembly 150 in this manner reduces the likelihood of any misalignment between the light source 179 and the lens 66. Such misalignment could result in undesirable distortion of the illumination light beam 64. Also, since the lens 66 is formed in the window assembly 150, it is located at the outermost portion of the scanning device housing 20. Accordingly, there are no additional optical components through which illumination light beam 64 must pass before reaching the object 54. As can be appreciated, the integrally formed lens 66 described above serves two functions; to focus the illumination light beam 64 on the object 54 and to close the housing 20 against the ingress of dust and other contaminants.

In order to allow unobstructed passage of the image beam 56 through the housing opening 25, LED board 62 may be provided with a notch 166 defined by rearwardly extending leg portions 168, 170, FIG. 12. The leg portions 168, 170 facilitate secure attachment of the LED board 62 to the remainder of the window assembly 150 by providing engagement with the window assembly rear wall 156.

Referring to FIG. 14, window assembly curved wall 159 serves to distance the window portion 152 and lens 66 of the window assembly from the object being scanned 54, as will be explained in further detail. The curved lower surface 161 of the wall 159 provides clearance for the roller 30 (which has been removed from FIG. 14 for clarity) when the window assembly 150 is mounted in the scanning device housing 120.

Mounting blocks 172, 176 may be provided with through-holes 174 and 178, respectively to facilitate attachment of the window assembly 150 to the scanning device optical assembly 40 as will be explained in further detail.

Referring to FIG. 14, it can be seen that the window assembly 150 closes the housing opening 25 while allowing unobstructed passage of image beam 56 through the window portion 152 and of light 64, FIG. 10, through the lens 66. In order to avoid relative movement between the window assembly 150 and the imaging assembly 40, the window assembly may be attached directly to the imaging assembly while being allowed to "float" with respect to the housing 20 as will be described in further detail.

For proper operation of the hand-held scanning device 10, it is important that the window assembly 150 not move relatively to the imaging assembly 40. Such relative movement could, for example, cause distortion of the imaging beam 56 as it passes through the window portion or physical interference with the imaging beam by portions of the window assembly 150. Further, because the lens 66 is integrally formed with the window assembly 150 and because the LED board 62 is mounted on the window assembly 150, relative movement between the window assembly 150 and the imaging assembly 40 also has the potential to cause misalignment of the illumination light beam 64 with the scan line portion 52 and, thus, result in inadequate illumination of the scan line portion 52.

The optical assembly 40 may be provided with a plurality of mounting blocks, such as the mounting block 186 shown in FIG. 14. Mounting block 186 may have an opening 188 therein which may be threaded. Accordingly, window assembly 150 may be securely attached to optical assembly 40 by passing a bolt or screw, not shown, through the through-hole 178 in the window assembly mounting block 176 and threading it into the opening 188 of the optical assembly mounting block 186. A similar mounting process may be used with respect to the window assembly mounting block 172, FIG. 12.

In the manner described above, the window assembly 150 may be rigidly attached to the optical assembly 40, thus preventing any undesirable relative movement between the window assembly 150 and the optical assembly 40 as previously described.

Housing 20 may be formed of a front housing portion 180 and a rear housing portion 182 which may be joined at a joint area 184. The front and rear housing portions 180, 182 may be held together by screws, not shown, which may, for example be passed through the holes 300, 302, 304, 306, 308, 310 in the rear housing portion 182, FIGS. 2 and 16, and engaged within the threaded holes 320, 322, 324, 326, 328 and 330, respectively, in the front housing portion 180, FIG. 15. Alternatively, the housing portions 180, 182 may be held together by any conventional mechanism.

Figure 15:
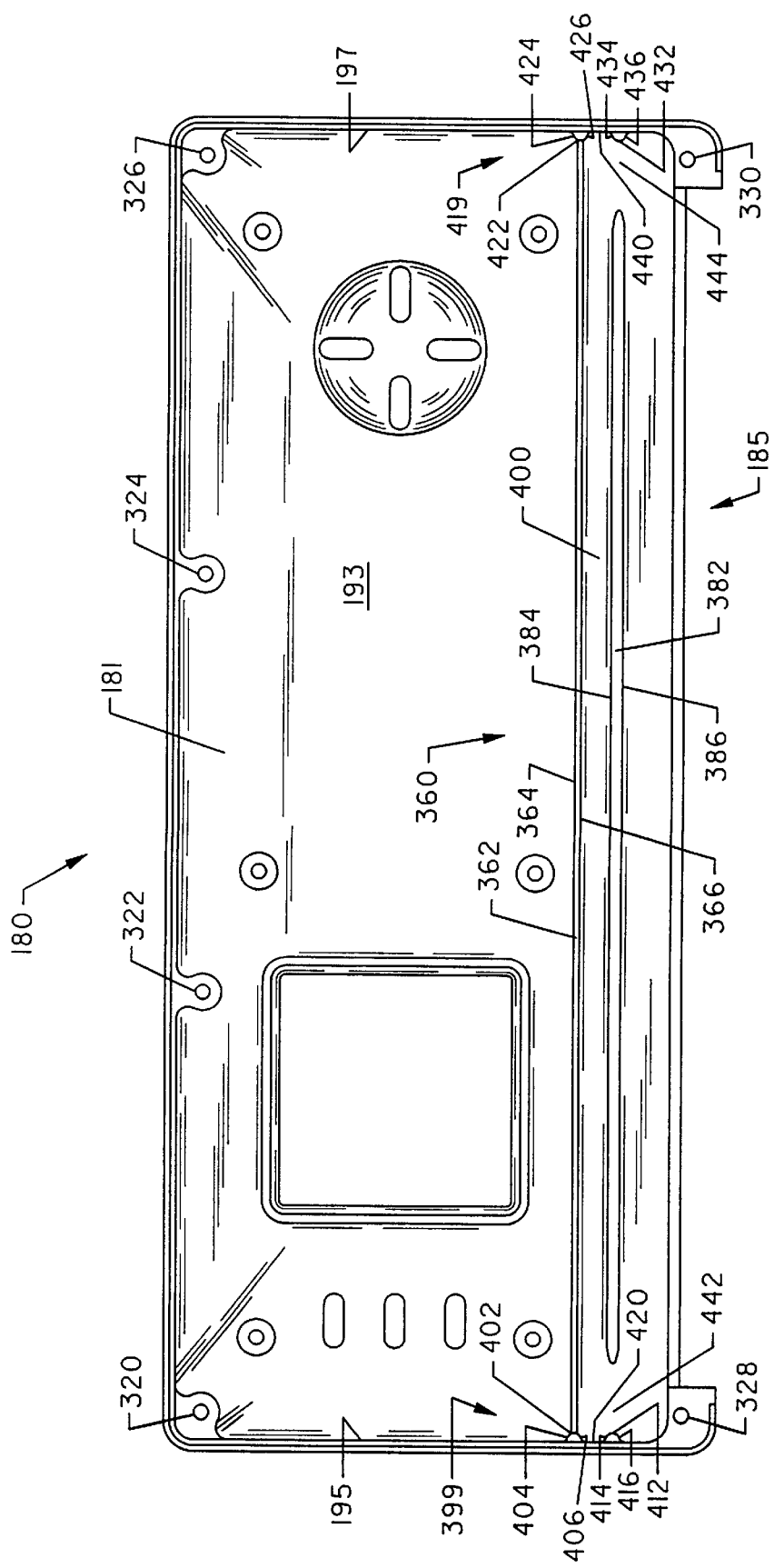
FIG. 15 is a rear elevation view of a front housing portion of the hand-held scanning device of FIG. 1, viewed from the inside thereof.

Front housing portion 180 may include a front opening portion 185 therein, FIG. 15. In a similar manner, rear housing portion 182 may include a rear opening portion 187 therein, FIG. 16. When the front and rear housing portions 180, 182 are assembled, as described above, the front opening portion 185 and the rear opening portion 187 combine to form the housing opening 25 previously described.

The optical assembly 40 may be provided with mounting blocks, such as the mounting blocks 189, 191, FIG. 14, in order to facilitate attachment of the optical assembly 40 to the rear housing portion 182. The mounting blocks 189, 191 may be provided with holes, not shown, which extend entirely through the optical assembly 40. A plurality of mounting blocks 340, 344, 348, FIG. 16, may be provided on the inner surface 183 of the rear housing portion 182 as shown. Each mounting block 340, 344, 348 may include a threaded hole 342, 346, 350, respectively, therewithin. To attach the optical assembly 40 to the rear housing portion 182, a plurality of screws, not shown, may be passed through the holes in the optical assembly mounting blocks 189, 191 and engaged within the rear housing portion mounting block threaded holes 342, 346, respectively. A third mounting block, not shown, may be provided on the optical assembly 40 in order to allow similar attachment to the rear housing portion mounting block threaded hole 350.

During use and transport of the hand-held scanning device 10, the housing 20 is often subjected to physical stresses. One example of a cause of such physical stress is when a user of the scanning device 10 squeezes the housing 20 while performing a scan. Since the housing 20 may be formed of plastic, which is relatively flexible, these stresses may cause relative movement to occur between various portions of the housing and, particularly, between the front housing portion 180 and the rear housing portion 182.

Because the optical assembly 40 is attached to the rear housing portion 182 and the window assembly 150 is rigidly attached to the optical assembly, relative movement may occur between the window assembly 150 and the front housing portion 180 due to the stresses described above. Accordingly, in order to effectively seal the housing 20 against entry of dust and other contaminants while accommodating this relative movement, the window assembly 150 may be designed to "float" with respect to the front housing portion 180 as will now be described in detail.

Referring to FIGS. 14 and 15, front housing portion 180 may include a seal mechanism 360 on the inner surface 181 thereof. Seal mechanism 360 may include an upper 362 and a lower 382 ridge, both located on the front inner surface 181 of the front housing portion 180 as shown. Upper ridge 362 may generally include an upper surface 364 and an oppositely disposed lower surface 366. In a similar fashion, lower ridge 382 may generally include an upper surface 384 and an oppositely disposed lower surface 386. A notch 400 is formed between the upper and lower ridges 362, 382 and has an upper surface formed by the upper ridge lower surface 366, a lower surface formed by the lower ridge upper surface 384 and a back surface formed by the front housing portion front inner surface 181. The upper and lower ridges 362, 382 may be integrally formed with the housing front portion 180.

A seal mechanism 399 may be formed on the right side inner surface 195 of the front housing portion 180 and may include upper and lower ridges 402, 412 as shown. Upper ridge 402 may generally include an upper surface 404 and an oppositely disposed lower surface 406. In a similar fashion, lower ridge 412 may generally include an upper surface 414 and an oppositely disposed lower surface 416. A notch 420 is formed between the upper and lower ridges 402, 412 and has an upper surface formed by the upper ridge lower surface 406, a lower surface formed by the lower ridge upper surface 414 and a back surface formed by the front housing portion right side inner surface 195. The upper and lower ridges 402, 412 may be integrally formed with the housing front portion 180.

A seal mechanism 419 may be formed on the left side inner surface 197 of the front housing portion 180 and may include upper and lower ridges 422, 432 as shown. Upper ridge 422 may generally include an upper surface 424 and an oppositely disposed lower surface 426. In a similar fashion, lower ridge 432 may generally include an upper surface 434 and an oppositely disposed lower surface 436. A notch 440 is formed between the upper and lower ridges 422, 432 and has an upper surface formed by the upper ridge lower surface 426, a lower surface formed by the lower ridge upper surface 434 and a back surface formed by the front housing portion left side inner surface 197. The upper and lower ridges 422, 432 may be integrally formed with the housing front portion 180.

The seal mechanism upper ridge portions 362, 402 and 422, as described above, may connect with one another in order to form a continuous ridge extending along the front housing portion front inner surface 181, the right side inner surface 195 and the left side inner surface 197. The seal mechanism lower ridge 382, on the other hand, may be separated from the ridge 412 by a flat area 442 and from the ridge 432 by a flat area 444. The shape of the flat areas 442 and 444 may generally correspond to the taper of the front housing portion 180 in the area of the flat areas 442, 444.

Figure 16:
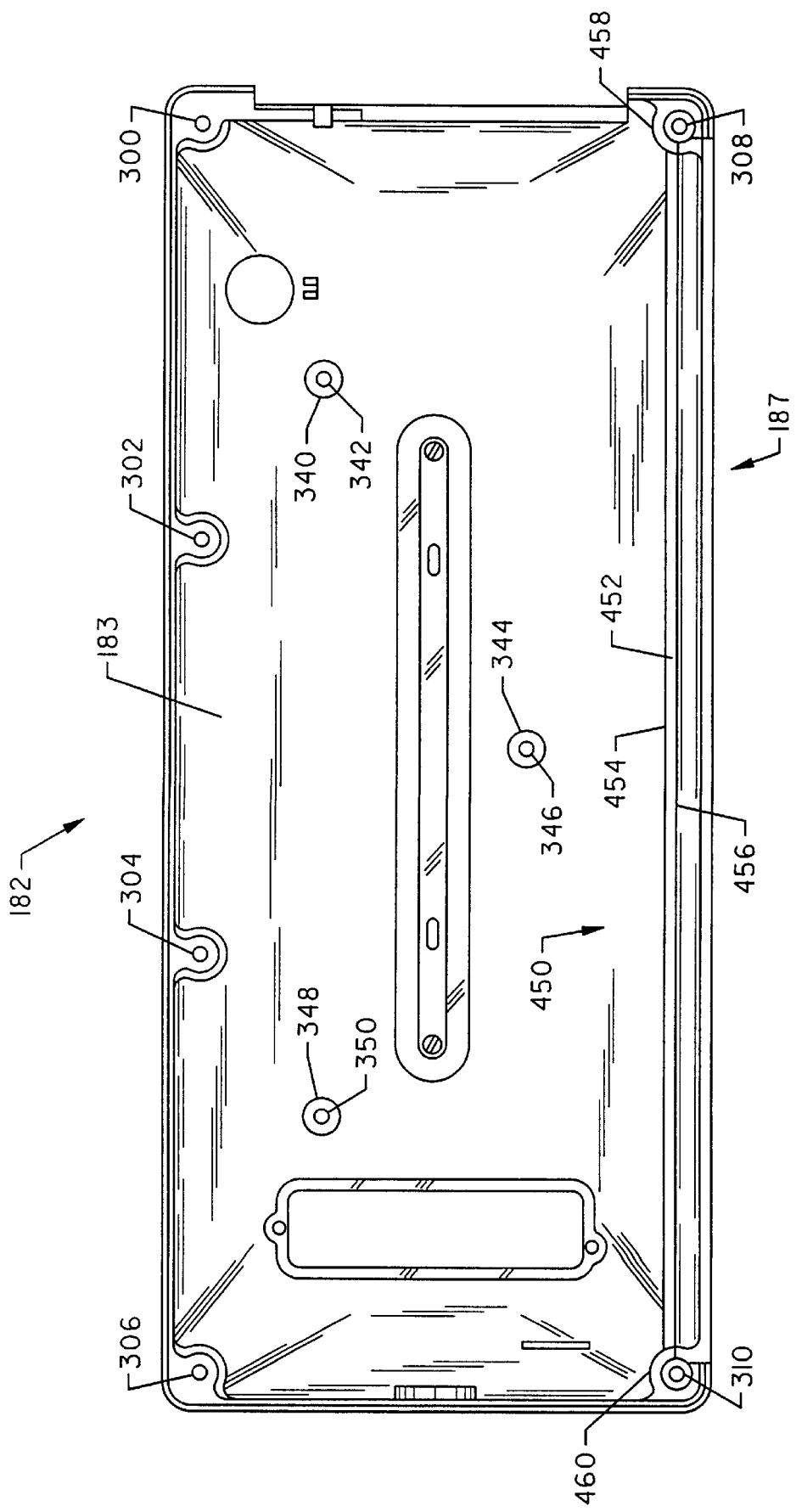
FIG. 16 is a front elevation view of a rear housing portion of the hand-held scanning device of FIG. 1, viewed from the inside thereof.

Referring to FIG. 16, rear housing portion 182 may include a seal mechanism 450 on the inner surface 183 thereof. Seal mechanism 450 may include a ridge 452 having an upper surface 454 and a lower surface 456 as shown. The ridge may generally extend between a pair of mounting blocks 458, 460 which may contain the holes 308, 310, respectively, as previously described.

Figure 17:
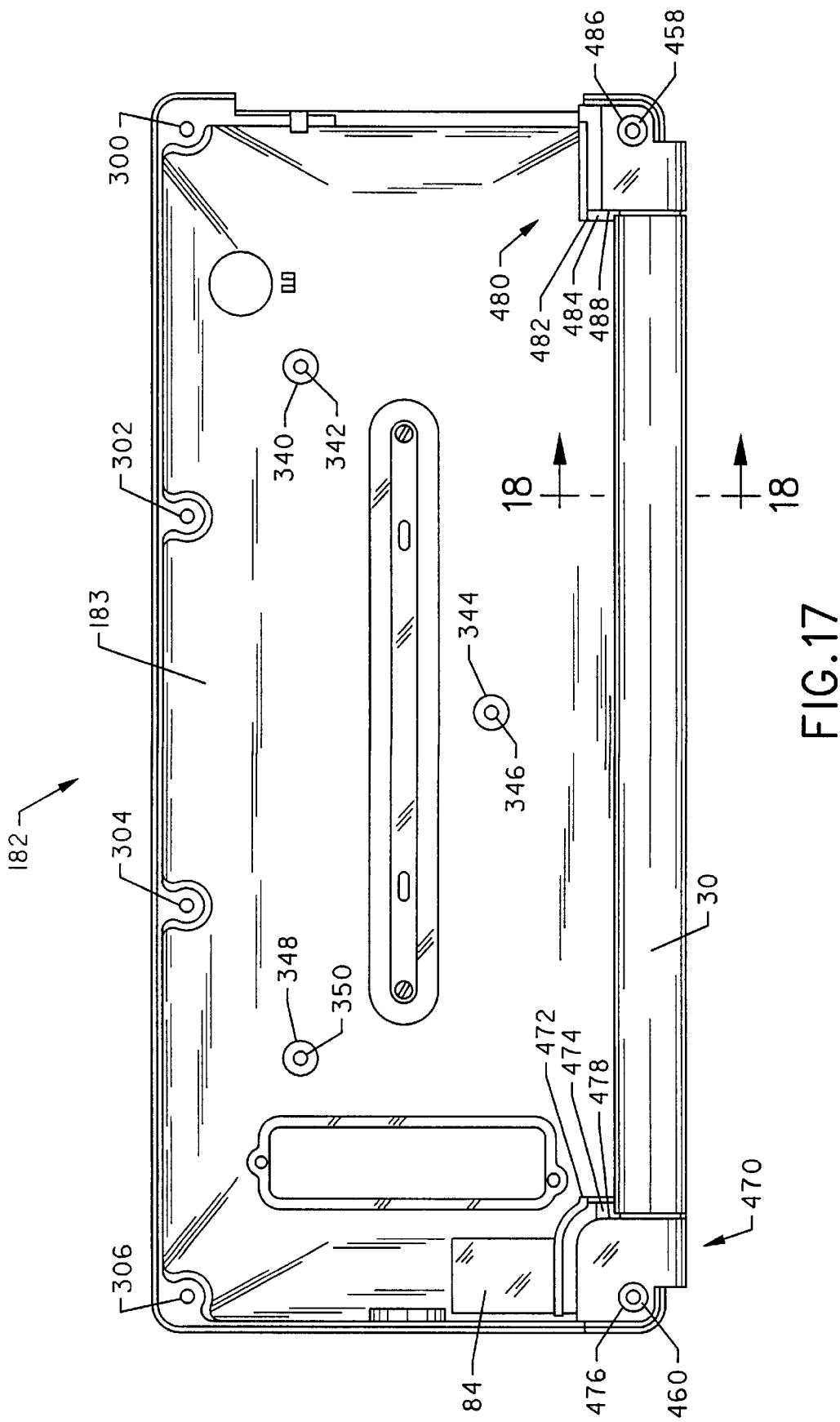
FIG. 17 is a front elevation view of the rear housing portion of FIG. 16 with a roller mechanism installed.
Figure 18:
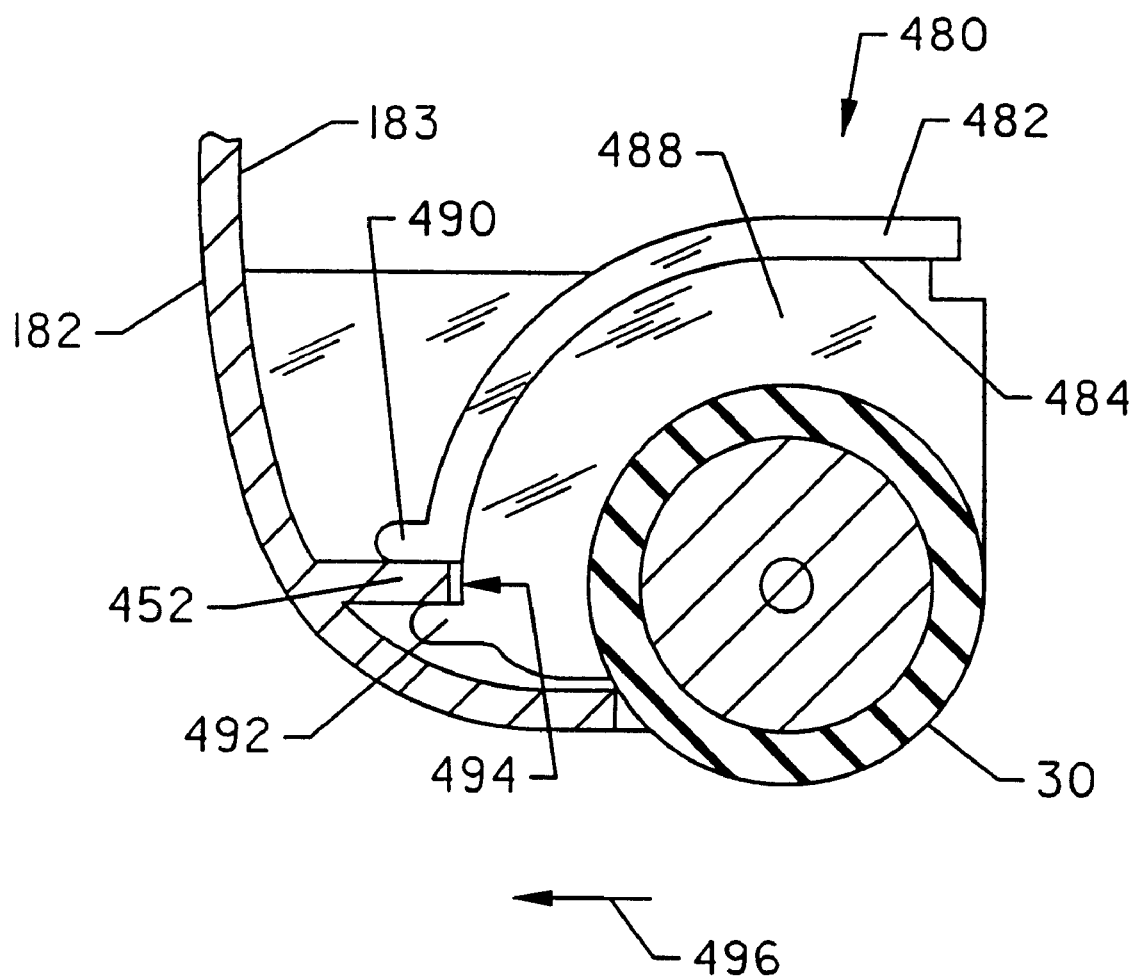
FIG. 18 is a cross-sectional view taken along the line 18—18 of FIG. 17.

FIGS. 17 and 18 illustrate the roller 30 installed within the rear housing portion 182 in a manner as will now be described in detail. The roller 30 may include first and second support blocks 470, 480 located at opposite ends of the roller 30. Each of the support blocks 470, 480 may include a bearing, not shown, which allows the roller 30 to rotate relatively to the support blocks in a conventional manner.

First support block 470 may include an arcuate flange portion 472 extending transversely from a vertically disposed surface 478. Arcuate flange portion 472 may be generally concentric with the roller axis RR, e.g., FIG. 1, and may include a curved inner surface 474 located thereon as shown. First support block 470 may also include a through-hole 476. A roller drive motor 84, as previously described, may be located adjacent the first support block 470 as shown. A plurality of drive gears may be housed within the first support block 470 in a conventional manner in order to drivingly connect the drive motor 84 with the roller 30.

In a similar manner to the first support block 470, second support block 480 may include an arcuate flange portion 482 extending transversely from a vertically disposed surface 488. Arcuate flange portion 482 may be generally concentric with the roller axis RR, e.g., FIG. 1, and may include a curved inner surface 484 located thereon as shown. Second support block 480 may also include a through-hole 486 as shown. Referring to FIG. 18, second support block 480 may also include an upper projection 490, which may be continuous with the arcuate flange portion 482, and a lower projection 492 which is spaced from the upper projection 490, thus forming a notch 494 therebetween as shown.

To install the second support block 480 within the rear housing portion 182, as shown in FIGS. 17 and 18, for example, the second support block hole 486, FIG. 17, is first placed over the rear housing portion mounting block 458. Continued movement of the second support block in the direction 496, FIG. 18, will result in the rear housing portion ridge 452 engaging within the second support block notch 494 as shown.

The first support block 470 may be installed in a substantially identical manner to that described above with respect to the second support block 480. It is noted that, although not illustrated, the first support block 470 may include an upper projection, a lower projection and a notch in an identical manner to the second support block upper projection 490, lower projection 492 and notch 494 as described above. Accordingly, when the first support block is fully installed, the rear housing portion ridge 452 will engage within the first support block notch.

As can be appreciated, when both the first and second support blocks are mounted within the rear housing portion 182, as described above, the roller 30 will be securely, rotatably located with respect to the rear housing portion 182.

When the window assembly 150 is installed within the scanning device housing opening 25 as shown, for example, in FIG. 14, the window assembly 150 will seal against and close the bottom of the rear housing portion 182 as will now be described in detail.

As can be seen with reference to FIG. 14, window assembly lip portion upper surface 199, FIG. 13, is engaged with the lower surface 456 of the rear housing portion ridge 452, FIGS. 14 and 16, thus sealing the rear of the window assembly 150 to the rear housing portion 182.

A first end portion of window assembly upper surface 163 which is proximate the curved end portion 165, FIG. 12, will seal against the curved inner surface 484 of the roller support block 480, FIGS. 17 and 18, and the window assembly curved end portion 165, FIG. 12, will be located in close proximity to the vertically disposed surface 488, FIGS. 17 and 18, of the roller support block 480. In a similar manner, a second end portion of window assembly upper surface 163 which is proximate curved end portion 167, FIG. 12, will seal against the curved inner surface 474 of the roller support block 470, FIG. 17, and the window assembly curved end portion 167, FIG. 12, will be located in close proximity to the vertically disposed surface 478, FIG. 17, of the roller support block 470. In this manner, the window assembly 150 may be sealed to the roller support blocks 470, 480 and the sides of the window assembly 150 may, thus, be effectively sealed to the rear housing portion 182.

In a similar manner to that described above with respect to the rear housing portion 182, the window assembly 150 will also seal the lower portion of the front housing portion 180. Instead of being in contact with the front housing portion 180, however, the window assembly 150 is permitted to "float" with respect to the front housing portion 180 as will now be described in detail.

Referring to FIG. 14, it can be seen that the window assembly front edge member 196 is located in the notch 400 located between the front housing portion upper and lower ridges 362, 382. In a similar manner, the window assembly sidewall portion 158, FIG. 12, will be located in the notch 440, FIG. 15, located between the front housing portion upper and lower ridges 422, 432 and the window assembly sidewall portion 160, FIG. 12, will be located in the notch 420, FIG. 15, located between the front housing portion upper and lower ridges 402, 412. The window assembly beveled portions 169, 171, FIG. 12, will be in close proximity to the front housing portion flats 444, 442, respectively, FIG. 15.

As can be seen from FIG. 14, a clearance or space 410 is provided between the window assembly edge member 196 and the front housing portion seal assembly 360. This space 410 allows the front housing portion 180 to move relative to the window assembly 150 and, thus, prevents movement of the front housing portion 180 from causing relative movement between the window assembly 150 and the optical assembly 40.

Although allowing relative movement, the cooperating shapes of the window assembly edge member 196 and the front housing portion seal assembly 360 cause the space 410 to be formed as a tortuous path which effectively limits the amount of dust and other contaminants entering the housing 20. To enter the housing 20, contaminants must first pass through the space 410. Specifically, with reference to FIGS. 14 and 15, the space 410 extends between the window assembly front edge member 196 and the upper surface 384 of the seal assembly lower ridge 382, between the front edge member 196 and the inner surface 181 of the front housing portion 180 and between the window assembly front edge member 196 and the lower surface 366 of the seal assembly upper ridge 362. Accordingly, the space 410 is formed as a tortuous path, limiting the entry of contaminants into the interior of the housing 180.

As can be appreciated, similar tortuous paths are be formed between the window assembly side edge portion 158 and the front housing seal assembly 419 and between the window assembly side edge portion 160 and the front housing seal assembly 399. Specifically, with respect to the seal assembly 419, to enter the housing 20, contaminants must first pass between the window assembly edge portion 158 and the upper surface 426 of the seal assembly lower ridge 432 and then between the edge portion 158 and the left side inner surface 197 of the front housing portion 180 and thereafter between the window assembly edge portion 158 and the lower surface 426 of the seal assembly upper ridge 422.

In a similar manner, with respect to the seal assembly 399, to enter the housing 20, contaminants must first pass between the window assembly edge portion 160 and the upper surface 414 of the seal assembly lower ridge 412 and then between the edge portion 160 and the right side inner surface 195 of the front housing portion 180 and thereafter between the window assembly edge portion 160 and the lower surface 406 of the seal assembly upper ridge 402.

As can be appreciated from the above description, the window assembly is permitted to float with respect to the front housing portion 180, thus preventing the transmission of forces from the front housing portion 180 to the window assembly 150 and, thus, preventing undesirable relative movement between the window assembly 150 and the optical assembly 40. Although the window assembly 150 is permitted to float with respect to the front housing portion 180, the window assembly is effectively sealed to the housing 20 by the provision of a tortuous path formed between the window assembly 150 and the front housing portion 180 which prevents the ingress of dust and other contaminants into the housing 20.

As previously described, the curved wall 159 of window assembly 150, e.g., FIG. 14, causes both the window portion 152 and the lens 66 to be spaced from the object 54. Because the window portion 152 and lens 66 do not ride directly on the object 54, they are much less likely to be scratched or otherwise damaged during normal operation of the hand-held scanning device 10. Such scratching may result, for example, when a scanning device having an object-contacting window is moved across an object which is dirty or gritty or when a staple is encountered. A scratched or otherwise damaged window may distort the image beam 56 passing through the window and thus result in degradation of the quality of the image acquired by the hand-held scanning device 10. Similarly, a scratched or otherwise damaged light source lens may distort the light beam 64 passing through the lens and result in impairment of the light supplied by the light source 62 and, thus, also result in degradation of the image acquired by the hand-held scanning device 10. Image quality may also be adversely affected by a window which contains flaws not caused by contact with the object. Such flaws may be more prevalent in less expensive window materials.

The window portion 152, located as shown in FIG. 14, is removed from the focal area of the imaging assembly 40. Since optical systems of scanning devices must be focused on the object being scanned in order to maximize acquired image quality, locating the window adjacent the object, as in conventional scanning devices, necessarily places the window in the focal area of the optical system. Accordingly, any defects or flaws, such as scratches, on the window will be imaged on the photosensor array and thus will more significantly degrade the quality of the acquired image.

Window portion 152 may be located a distance "n" of at least about 0.30 inches above the object 54, FIG. 14 (when the hand-held scanning device 10 is not tilting). It has been found that this distance is sufficient to maintain the window 156 out of contact with the object during scanning operations and to adequately remove the window portion 152 from the focus area of the imaging system 40 when a lens having an f-number of about 4 and a depth of field of about 0.20 inches is provided. Most preferably, the window portion 152 may be located a distance Can't of about 0.55 inches above the object 54.

Window assembly 150 may be constructed of acrylic and be configured to contain both the window portion 152 and the lens 66 integrally formed therein. Window portion 152 may have a thickness "m" of about 0.080 inches, FIG. 13, and be formed of the same material as the remainder of the window assembly 150. Alternatively, window portion 152 may be a separate piece constructed of, e.g., glass and attached to window assembly 150 via, e.g., gluing.

In this manner, the window assembly 150 may be securely fastened to the scanning device housing 20 in a configuration which locates the window portion 152 out of the focus of the scanning device imaging system 40 and which prevents contact between the window portion 152 and the object being scanned. The window assembly 150 prevents entry of contaminants into the housing 20 while allowing unobstructed passage of the light beam 56 into the housing interior and may also support the LED board 62 thereon.

It will be appreciated that, although described with respect to a single roller hand-held scanning device, the window design described herein could be used with any type of scanning device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A photoelectric imaging apparatus in which a light path extends between an object which is to be imaged and a photosensor array, comprising:

a housing assembly defining a housing interior located on the inside thereof and a housing exterior located on the outside thereof;

an optical assembly including said photosensor array and at least one optical component located within said light path, said optical assembly being fixedly located with respect to said housing assembly and being located at least partially within said housing interior;

an opening in said housing assembly extending between said housing interior and said housing exterior, said light path passing through said opening;

a closure member located in said opening and including a window portion located within said light path; and wherein said closure member is attached to said optical assembly.

2. The apparatus of claim 1 wherein said housing substantially forms the external periphery of said photoelectric imaging apparatus.

3. The apparatus of claim 1 wherein said optical assembly is located entirely within said housing interior.

4. The apparatus of claim 1 wherein said closure member is rigidly attached to said optical assembly.

5. The apparatus of claim 1 wherein said closure member spans said opening.

6. The apparatus of claim 5 wherein at least a portion of said closure member is in a floating relationship with respect to at least a portion of said housing.

7. The apparatus of claim 1 wherein a tortuous path is formed between at least a portion of said closure member and at least a portion of said housing.

8. The apparatus of claim 1 and further comprising:

a pair of protrusions formed on said housing, said pair of protrusions defining a notch located therebetween;

an edge member formed on said closure member;

said edge member being at least partially located in said notch, between said pair of protrusions.

9. The apparatus of claim 8 wherein said edge member is spaced from at least one of said pair of protrusions.

10. The apparatus of claim 8 wherein said edge member is normally spaced from both of said protrusions when said housing is unstressed.

11. A photoelectric imaging apparatus in which a light path extends between an object which is to be imaged and a photosensor array, comprising:

a housing assembly defining a housing interior located on the inside thereof and a housing exterior located on the outside thereof;

an optical assembly including said photosensor array and at least one optical component located within said light path, said optical assembly being fixedly located with respect to said housing assembly and being located at least partially in said housing interior;

an opening in said housing assembly extending between said housing interior and said housing exterior, said light path passing through said opening;

a closure member movably retained in at least a portion of said opening and including a window portion located within said light path.

12. The apparatus of claim 11 wherein said housing substantially forms the external periphery of said photoelectric imaging apparatus.

13. The apparatus of claim 11 wherein said optical assembly is located entirely within said housing interior.

14. The apparatus of claim 11 wherein said closure member is attached to said optical assembly.

15. The apparatus of claim 11 wherein said closure member spans said opening.

16. The apparatus of claim 11 wherein a tortuous path is formed between at least a portion of said closure member and at least a portion of said housing.

17. The apparatus of claim 11 and further comprising:

a pair of protrusions formed on said housing, said pair of protrusions defining a notch located therebetween;

an edge member formed on said closure member;

said edge member being at least partially located in said notch, between said pair of protrusions.

18. The apparatus of claim 17 wherein said edge member is spaced from at least one of said pair of protrusions.

19. The apparatus of claim 17 wherein said edge member is normally spaced from both of said protrusions when said housing is unstressed.

20. A photoelectric imaging apparatus in which a light path extends between an object which is to be imaged and a photosensor array, comprising:

a housing assembly defining a housing interior located on the inside thereof and a housing exterior located on the outside thereof;

an optical assembly including said photosensor array and a plurality of optical components arranged along said light path, said optical assembly located at least partially in said housing interior;

an opening in said housing assembly extending between said housing interior and said housing exterior, said light path passing through said opening;

a closure member spanning said opening;

a space between said closure member and said opening, said space extending between said housing exterior and said housing interior and said space further defining a tortuous path.

21. The apparatus of claim 20 wherein said housing assembly substantially forms the external periphery of said photoelectric imaging apparatus.

22. The apparatus of claim 20 wherein said optical assembly is located entirely within said housing interior.

23. The apparatus of claim 20 wherein said closure member is attached to said optical assembly.

24. The apparatus of claim 20 wherein at least a portion of said closure member is in a floating relationship with respect to at least a portion of said housing.

25. The apparatus of claim 20 and further comprising:

a pair of protrusions formed on said housing, said pair of protrusions defining a notch located therebetween;

an edge member formed on said closure member;

said edge member being at least partially located in said notch, between said pair of protrusions.

26. The apparatus of claim 25 wherein said edge member is spaced from at least one of said pair of protrusions.

27. The apparatus of claim 25 wherein said edge member is normally spaced from both of said protrusions when said housing is unstressed.

* * * * *